(12) United States Patent
Kim et al.

(10) Patent No.: US 11,265,086 B2
(45) Date of Patent: Mar. 1, 2022

(54) LOW RATE LOSS BIT-LEVEL DISTRIBUTION MATCHER FOR CONSTELLATION SHAPING

(71) Applicant: Fujitsu Limited, Kawasaki (JP)

(72) Inventors: Inwoong Kim, Allen, TX (US); Olga I. Vassilieva, Plano, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 11 days.

(21) Appl. No.: 16/721,216

(22) Filed: Dec. 19, 2019

(65) Prior Publication Data

US 2021/0194596 A1    Jun. 24, 2021

(51) Int. Cl.
| | | |
|---|---|---|
| *H04B 10/69* | (2013.01) |
| *G06F 17/18* | (2006.01) |
| *H04J 14/02* | (2006.01) |
| *H04B 10/516* | (2013.01) |

(52) U.S. Cl.
CPC ......... *H04B 10/6932* (2013.01); *G06F 17/18* (2013.01); *H04B 10/516* (2013.01); *H04J 14/0227* (2013.01)

(58) Field of Classification Search
CPC .............. H04B 10/6932; H04B 10/516; H04B 10/541; H04B 10/616; H04J 14/0227; H04J 14/026; H04J 14/0298; G06F 17/18
USPC .................................................... 398/43–79
See application file for complete search history.

(56) References Cited

U.S. PATENT DOCUMENTS

| | | | | |
|---|---|---|---|---|
| 10,069,519 B1 * | 9/2018 | Millar | ................ | H03M 13/05 |
| 10,091,046 B1 * | 10/2018 | Lefevre | ................ | H04L 1/0041 |
| 10,116,392 B1 * | 10/2018 | Kim | ................ | H04B 10/58 |
| 10,396,899 B1 * | 8/2019 | Kim | ................ | H04B 10/541 |
| 10,516,503 B1 * | 12/2019 | Millar | ................ | G06N 7/005 |
| 10,530,490 B1 * | 1/2020 | Vassilieva | ............ | H04B 10/612 |
| 10,601,517 B1 * | 3/2020 | Kim | ................ | H04B 10/541 |

(Continued)

OTHER PUBLICATIONS

Gultekin et al.; Probabilistic shaping for finite block lengths: Distribution Matching and sphere shaping; Sep. 2019; IEEE; pp. 1-18. (Year: 2019).*

(Continued)

*Primary Examiner* — Amritbir K Sandhu
(74) *Attorney, Agent, or Firm* — Baker Botts L.L.P.

(57) ABSTRACT

Systems and methods for constellation shaping using low rate loss bit-level distribution matchers include receiving blocks of input bits and, for each input block of a predetermined size, assigning a respective codeword of a predetermined output block size. The number of bits of a given bit value in the codeword is dependent on a predetermined target probability distribution. A one-to-one mapping exists between each possible combination of input bits and a codeword for input blocks containing the combination. Some codewords include a number of bits having the given bit value that is different than the predetermined target probability distribution, but an average number of bits having the given bit value in the available codewords meets the predetermined target probability distribution. The disclosed methods result in more available codewords and a lower rate loss than in bit-level distribution matchers with a constant modulus, while achieving similar shaping.

20 Claims, 11 Drawing Sheets

(56) References Cited

U.S. PATENT DOCUMENTS

| | | | | |
|---|---|---|---|---|
| 10,700,807 | B1* | 6/2020 | Vassilieva | H04J 14/06 |
| 10,749,554 | B1* | 8/2020 | Millar | H04L 1/0058 |
| 10,785,085 | B2* | 9/2020 | Jardel | H04L 27/362 |
| 10,848,269 | B2* | 11/2020 | Ebrahimzad | H04B 10/556 |
| 11,012,187 | B1* | 5/2021 | Kim | H04L 1/0047 |
| 2018/0367246 | A1* | 12/2018 | Kakande | H04L 1/0042 |
| 2019/0149390 | A1* | 5/2019 | Torbatian | H04J 14/0205 375/298 |
| 2019/0215077 | A1* | 7/2019 | Chien | H04L 25/03834 |
| 2020/0313773 | A1* | 10/2020 | Torbatian | H04L 27/3483 |

OTHER PUBLICATIONS

Yoshida et al.; Hierarchical Distribution Matching for Probabilistically shaped coded modulation; Dec. 2018; IEEE; pp. 1-11. (Year: 2018).*

Gultekin et al.; Probabilistic shaping for finite block lengths: Distribution matching and sphere shaping; May 2020; MDPI, pp. 1-31. (Year: 2020).*

Fehenberger et al; Parallel-Amplitude Architecture and Subset Ranking for Fast Distribution Matching; Feb. 2019; IEEE; pp. 1-10. (Year: 2019).*

Bocherer et al; High Throughput Probabilistic Shaping with Product Distribution Matching; Feb. 2017; IEEE; pp. 1-10. (Year: 2017).*

Pikus et al; Arithmetic Coding Based Multi-Composition Codes for Bit-Level Distribution Matching; May 2019;Huawei Technologies; pp. 1-10. (Year: 2019).*

Yoshida et al; Hierarchical Distribution Matching for Probabilistically Shaped Coded Modulation; Mar. 2019; Journal of lightwave technology, vol. 37, No. 6; pp. 1-11 (Year: 2019).*

Böcherer, Georg, Patrick Schulte, and Fabian Steiner. "High throughput probabilistic shaping with product distribution matching." arXiv preprint arXiv: 1702.07510 (2007).

Yoshida, Tsuyoshi, Magnus Karlsson, and Erik Agrell. "Short-block-length shaping by simple mark ratio controllers for granular and wide-range spectral efficiencies." *2017 European Conference on Optical Communications (ECOC)*. IEEE, 2017.

Pikus, Marcin, and Wen Xu. "Applying bit-level probabilistically shaped coded modulation for high-throughput communications." *2017 IEEE 28th Annual International Symposium on Personal, Indoor, and Mobile Radio Communications (PIMRC)*. IEEE, 2017.

* cited by examiner

LOW RATE LOSS BIT-LEVEL DISTRIBUTION MATCHER FOR CONSTELLATION SHAPING

BACKGROUND

Field of the Disclosure

The present disclosure relates generally to optical communication networks and, more particularly, to constellation shaping of modulation formats for optical communication systems using low rate loss bit-level distribution matchers.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Optical superchannels are an emerging solution for transmission of optical signals at 400 Gb/s and 1 Tb/s data rate per channel, and hold promise for even higher data rates in the future. A typical superchannel includes a set of subcarriers that are frequency multiplexed to form a single wavelength channel. The superchannel may then be transmitted through an optical network as a single channel across network endpoints. The subcarriers within the superchannel are tightly packed to achieve high spectral efficiency, enabling superchannels to achieve an increase in data capacity. However, the reach of optical signals, even when using superchannels, may still be limited by optical signal-to-noise ratio (OSNR) levels experienced during transmission. In some systems, in order to extend the transmission reach of certain optical signals, such as high capacity optical signals modulated using an advanced modulation format, constellation shaping is applied to the optical signals.

SUMMARY

In one aspect, a bit-level distribution matcher for probabilistic constellation shaping includes circuitry configured to receive a portion of a binary bit stream to be transmitted as an optical signal. For each input block of consecutively received binary bits in the portion of the binary bit stream having a predetermined input block size, the bit-level distribution matcher includes circuitry to assign, based on values of the consecutively received binary bits in the input block, a respective codeword for the input block having a predetermined output block size, the respective codeword including a number of binary bits having a given bit value that is dependent on a predetermined target probability distribution for input blocks received by the bit-level distribution matcher and to output the respective codeword as an element of a shaped bit sequence representing the portion of the binary bit stream. A one-to-one mapping exists between each combination of bit values possible to be included in an input block received by the bit-level distribution matcher and a respective codeword to be assigned to input blocks containing the combination of bit values. For at least two of the possible combinations of bit values, the respective codeword to be assigned to input blocks containing the combination of bit values includes a number of binary bits having the given bit value that is different than a number of binary bits having the given bit value that corresponds to the predetermined target probability distribution for input blocks received by the bit-level distribution matcher. For all of the possible combinations of bit values, an average number of binary bits having the given bit value in the respective codewords to be assigned to input blocks containing the combinations of bit values is equal to the number of binary bits having the given bit value that corresponds to the predetermined target probability distribution for input blocks received by the bit-level distribution matcher.

In another aspect, a method for probabilistic constellation shaping using bit-level distribution matching includes receiving, by a first bit-level distribution matcher, a portion of a binary bit stream to be transmitted as an optical signal. For each input block of consecutively received binary bits in the portion of the binary bit stream having a predetermined input block size, the method includes assigning, based on values of the consecutively received binary bits in the input block, a respective codeword for the input block having a predetermined output block size, the respective codeword including a number of binary bits having a given bit value that is dependent on a predetermined target probability distribution for input blocks received by the first bit-level distribution matcher, outputting the respective codeword as an element of a shaped bit sequence representing the portion of the binary bit stream, and generating the optical signal to be transmitted dependent on the shaped bit sequence output by the first bit-level distribution matcher. A one-to-one mapping exists between each combination of bit values possible to be included in an input block received by the first bit-level distribution matcher and a respective codeword to be assigned to input blocks containing the combination of bit values. For at least two of the possible combinations of bit values, the respective codeword to be assigned to input blocks containing the combination of bit values includes a number of binary bits having the given bit value that is different than a number of binary bits having the given bit value that corresponds to the predetermined target probability distribution for input blocks received by the first bit-level distribution matcher. For all of the possible combinations of bit values, an average number of binary bits having the given bit value in the respective codewords to be assigned to input blocks containing the combinations of bit values is equal to the number of binary bits having the given bit value that corresponds to the predetermined target probability distribution for input blocks received by the first bit-level distribution matcher.

In any of the disclosed embodiments, the method may further include, prior to receiving the portion of the binary bit stream, identifying, based on a bounded-energy trellis representation of potential output block elements, all possible codewords of the output block size including no more than a predetermined maximum number of bits having the given bit value, selecting a subset of the identified codewords to be assigned to input blocks by the first bit-level distribution matcher such that an average number of binary bits having the given bit value in the selected subset of identified codewords is equal to the number of binary bits having the given bit value that corresponds to the predetermined target probability distribution, and configuring the first bit-level distribution matcher to assign the respective codeword for the input block according to a one-to-to mapping between each combination of bit values possible to be included in an input block received by the first bit-level distribution matcher and a respective codeword in the selected subset of the identified codewords.

In any of the disclosed embodiments, the method may further include, determining, based on a bounded-energy trellis representation of potential output block elements, an index value associated with the respective codeword assigned for the input block and recovering, by a bit-level distribution de-matcher, the input block from the respective codeword based on the determined index value.

In yet another aspect, an optical transport network for constellation shaping using bit-level distribution matching includes an optical transmission path, including an optical transmitter and an optical receiver. The optical transmitter is configured to receive, by a first bit-level distribution matcher of the optical transmitter, a portion of a binary bit stream to be transmitted as an optical signal. For each input block of consecutively received binary bits in the portion of the binary bit stream having a predetermined input block size, the optical transmitter is configured to assign, based on values of the consecutively received binary bits in the input block, a respective codeword for the input block having a predetermined output block size, the respective codeword including a number of binary bits having a given bit value that is dependent on a predetermined target probability distribution for input blocks received by the first bit-level distribution matcher, to output the respective codeword as an element of a shaped bit sequence representing the portion of the binary bit stream, and to generate the optical signal to be transmitted dependent on the shaped bit sequence output by the first bit-level distribution matcher. A one-to-one mapping exists between each combination of bit values possible to be included in an input block received by the first bit-level distribution matcher and a respective codeword to be assigned to input blocks containing the combination of bit values. For at least two of the possible combinations of bit values, the respective codeword to be assigned to input blocks containing the combination of bit values includes a number of binary bits having the given bit value that is different than a number of binary bits having the given bit value that corresponds to the predetermined target probability distribution for input blocks received by the first bit-level distribution matcher. For all of the possible combinations of bit values, an average number of binary bits having the given bit value in the respective codewords to be assigned to input blocks containing the combinations of bit values is equal to the number of binary bits having the given bit value that corresponds to the predetermined target probability distribution for input blocks received by the first bit-level distribution matcher.

In any of the disclosed embodiments, assigning the respective codeword for the input block may include determining, based on values of the received binary bits in the input block, an index value for the input block and mapping the index value for the input block to the respective codeword.

In any of the disclosed embodiments, assigning the respective codeword for the input block may include selecting the respective codeword from among all possible codewords of the output block size including no more than a predetermined maximum number of bits having the given bit value.

In any of the disclosed embodiments, receiving the portion of the binary bit stream may include receiving the portion of the binary bit stream from a de-multiplexing element that routes consecutive bits in the binary bit stream to different ones of a plurality of bit-level distribution matchers including the first bit-level distribution matcher.

In any of the disclosed embodiments, the predetermined target probability distribution for input blocks received by the first bit-level distribution matcher may be different than a predetermined target probability distribution for input blocks received by a second one of the plurality of bit-level distribution matchers.

In any of the disclosed embodiments, the given bit value may be a value of one and the predetermined target probability distribution may define a number of bits in respective codewords to be assigned to input blocks by the bit-level distribution matcher having a value of one.

In any of the disclosed embodiments, the given bit value may be a value of zero and the predetermined target probability distribution may define a number of bits in respective codewords to be assigned to input blocks by the bit-level distribution matcher having a value of one.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
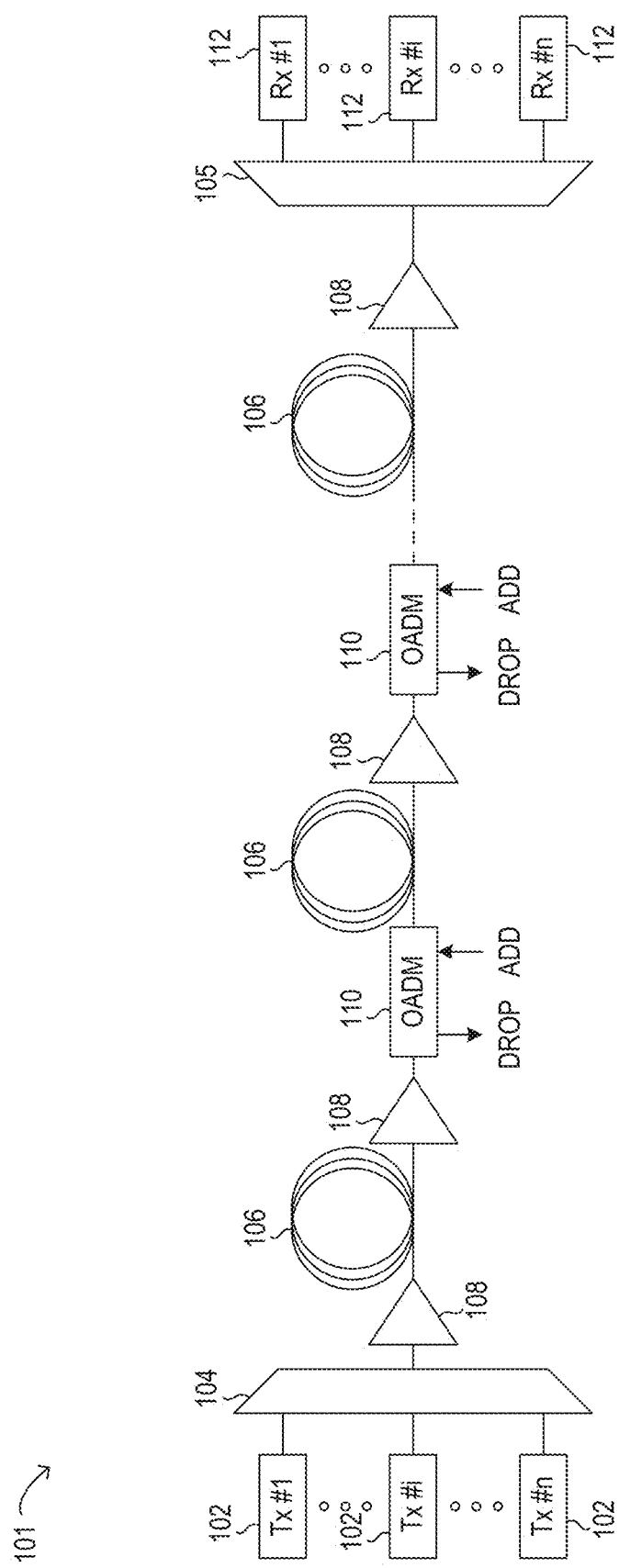
FIG. 1 is a block diagram of selected elements of an embodiment of an optical transport network.

Referring now to the drawings, FIG. 1 illustrates an example embodiment of optical transport network (OTN) 101, which may represent an optical communication system. Optical transport network 101 includes one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more de-multiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber, among others.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. Thus, in a superchannel, subcarriers are tightly packed and consume less optical spectrum than in conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the baud rate.

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. An example of transmitter 102 for applying different modulation formats is a universally programmable transceiver. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of de-multiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more de-multiplexers 105 at one or more destinations of network 101. De-multiplexer 105 may comprise a system apparatus or device that acts as a de-multiplexer by splitting a single composite WDM signal into individual channels at respective wavelengths. For example, optical transport network 101 may transmit and carry a forty (40) channel DWDM signal. De-multiplexer 105 may divide the single, forty channel DWDM signal into forty separate signals according to the forty different channels. It will be understood that different numbers of channels or subcarriers may be transmitted and de-multiplexed in optical transport network 101, in various embodiments.

In FIG. 1, optical transport network 101 may also include receivers 112 coupled to de-multiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "M-QAM."

Examples of PSK and QAM with a different number of symbols can include binary PSK (BPSK or 2-PSK) using two phases at 0° and 180° (or in radians, 0 and π) on the constellation diagram; or quadrature PSK (QPSK, 4-PSK, or 4-QAM) using four phases at 0°, 90°, 180°, and 270° (or in radians, 0, π/2, π, and 3π/2). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, M-QAM signals may be polarized using techniques such as dual-polarization 16-QAM (DP-16-QAM), wherein separate M-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarriers (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (see also FIG. 3) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 represents a certain transmission capacity for data. As the demand for transmission capacity continues to increase, various methods may be employed to accommodate greater transmission capacity on optical transport network 101. For example, advanced modulation formats, such as 16-QAM or 64-QAM, may be used to increase transmission capacity per wavelength channel. The advanced modulation formats may be applied using transmitter 102 and receiver 112. However, the use of higher order modulation formats may result in decreased transmission reach (also referred to simply as 'reach') of the optical signal. For example, the reach may be determined by an acceptable value for bit error rate (BER), and accordingly OSNR, which may be observed at receivers 112.

Another strategy for increasing transmission capacity is the use of a superchannel, in which multiple subcarrier signals are densely packed in a fixed bandwidth band and may be transmitted at very high data rates, such as 400 Gb/s, 1 Tb/s, or higher. As noted above, optical superchannels may represent a promising solution for transmission of signals at 400 Gb/s and 1 Tb/s data rate per channel. However, as noted above, superchannels are typically used with flexible grid network components, which may not be universally available. Also, administration of superchannels may be associated with additional layers of network management, which may be undesirable in certain networks. While the use of superchannels typically enables an increase in transmission capacity, superchannels do not extend the transmission reach of optical signals using optical transport network 101.

In operation of optical transport network 101, in order to extend the transmission reach of certain optical signals, such as high capacity optical signals modulated using an advanced modulation format, constellation shaping may be applied to the optical signals. In constellation shaping, data bits are mapped and coded into improved constellations that may exhibit improved noise tolerance or increased OSNR. As a result of the improved noise tolerance, the reach of an optical signal in which constellation shaping has been applied may be increased, which is desirable for optical communication using optical transport network 101. In a typical modulation format (such as QPSK or M-QAM), the symbols exhibit a uniform distribution in the complex plane, shown as uniformly distribution constellation points in a constellation diagram. When constellation shaping is applied to a modulation formation, the distribution of the symbols in the complex plane is changed to provide an improved mapping for noise tolerance. In some instances, the distribution of symbols may be a Gaussian or Gaussianlike distribution that is shown as non-uniform constellation points in the constellation diagram (see also FIG. 2B).

As noted above, transmitter 102 may be a universally programmable transceiver for applying different modulation formats, while receiver 112 may include the corresponding functionality for demodulation. Thus, transmitter 102 may support the use of constellation shaping and may be selectively programmed to apply constellation shaping on a per channel basis, while receiver 112 may correspondingly demodulate channels to which a certain kind of constellation shaping has been applied. In various embodiments, transmitter 102 and receiver 112 may include respective mapping/de-mapping functionality, such as within a digital signal processing (DSP) module, to enable implementation of constellation shaping in optical transport network 101.

In one example, constellation shaping may involve superposition mapping, as described in Equation 1.

$$y = y_I + jy_Q = \Sigma_{n=1}^{N} e^{jπb_n} h_n \quad \text{Equation (1)}$$

In Equation 1:

y is the optical signal comprised of modulated symbols;

$y_I$ and $y_Q$ are the in-phase (real) and quadrature (imaginary) quadrature components;

N is the number of bits per symbol;

$b_n$ are the encoded binary bits; and $h_n$ represents a weighted symbol mapping scheme, given by $h_n = α_n e^{jθ_n}$, where $α_n$ is an amplitude power factor and $θ_n$ is a phase power factor.

In this example, $h_n$ allocates a certain amplitude and phase to each symbol. By tuning the amplitude power factor $α_n$ and the phase power factor $θ_n$, different superposition mapping schemes can be implemented. For example, in superposition coded mapping using phase-shifted modulation (PSM), the amplitude power factor $α_n$ is kept constant and the phase power factor $θ_n$ is uniformly distributed in the complex plane. Additionally, different encoding schemes may be applied prior to superposition mapping, such as superposition coded mapping using bit-interleaved coded modulation. It is noted that when superposition mapping is used in a non-bijective (many-to-one) mapping, decoding and de-mapping at the receiver may involve iterative operations.

Other constellation shaping techniques include iterative polar modulation (IPM) and low-density parity check (LPDC) coded modulation with probabilistic shaping. Probabilistic shaping (PS) based on M-QAM has been studied as a way to control spectral efficiency with finer granularity and to achieve an improved performance closer to Shannon capacity limit. In one example, PS-M-QAM may be implemented using constant composition distribution matching (CCDM). Performing probabilistic shaping based on M-QAM may improve utilization of network resource. In some cases, the shaped profile follows a Maxwell-Boltzmann distribution. Using existing methods, the minimum entropy of probabilistic shaping based on M-QAM is 2 bits/symbol, which corresponds to QPSK, where entropy, as a measure of information, is defined as the number of bits of information contained in each message or symbol, where channel noise is not considered.

In optical transport network 101, constellation shaping may be activated/deactivated as a procedure in network operations on a per channel basis for a given optical path. In this manner, the available spectrum may be flexibly allocated in terms of bandwidth and constellation shaping to meet various traffic demands, based on specific path information (distance, number/type of co-propagating channels, fiber type, and dispersion map), which may be economically desirable. Furthermore, constellation shaping using universal programmable transceivers in optical transport network 101 may provide improvements in reach with the same electronics and optical components that are already available and installed, which may enable a rapid upgrade to implement constellation shaping.

As noted above, entropy may be defined as the number of bits of information contained in each message or symbol. Entropy may be calculated using the following equation:

$$H(X) = -\Sigma_i P(x_i) \log_2 P(x_i) \quad \text{Equation (2)}$$

In Equation 2, X is a discrete random variable with M possible symbols $\{x_1, x_2, \ldots x_M\}$, and P(X) is a probability mass function representing the probability of each symbol assigned. For a uniform distribution, Equation 2 becomes:

$$H(X) = -\sum_{i=1}^{M} \frac{1}{M} \log_2 \frac{1}{M} \text{ or} \quad \text{Equation (3)}$$

$$\log_2 M = m \text{ (bits/symbol)} \quad \text{Equation (4)}$$

Figures 2A, 2B:
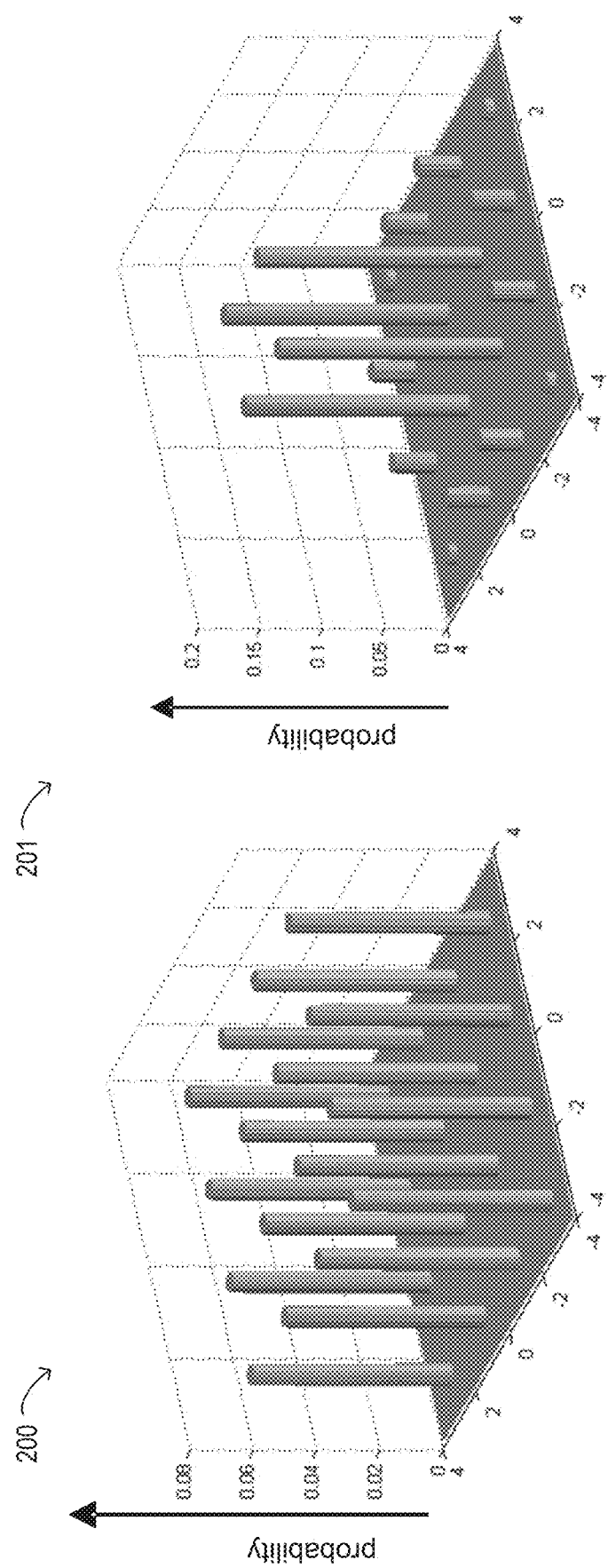
FIG. 2A illustrates selected elements of an embodiment of a probability distribution diagram for constellation points in a uniformly shaped 16-QAM constellation.
FIG. 2B illustrates selected elements of an embodiment of a probability distribution diagram for constellation points in a probabilistically shaped 16-QAM constellation.

FIG. 2A illustrates selected elements of an embodiment of a uniform probability distribution diagram 200 corresponding to a constellation diagram in the complex plane for 16-QAM. In this example, for 16-QAM with a uniform distribution, there would be 16 different symbols, each having a probability of $1/16^{th}$. The height of each column represents a probability value for a symbol in a corresponding position in constellation diagram 200. In this example, the probability of each symbol assigned is $1/16$ or 0.0625. Plugging the probability $P=1/16$ into Equation 2 above, plugging M=16 into Equation 3 above, or plugging M=16 into Equation 4, as shown below, yields an entropy of four bits per symbol.

$\log_2 16 = 4$ (bits/symbol)

Referring now to FIG. 2B, selected elements of an embodiment of a probability distribution diagram 201 for constellation points in a probabilistically shaped 16-QAM constellation are shown. In probability distribution diagram 201, the probabilistically shaped 16-QAM constellation is shown having a non-uniform probability distribution of constellation points as an example of constellation shaping, as disclosed herein. The height of each column represents a probability value for a symbol in a corresponding position in a constellation diagram for 16-QAM.

As illustrated in FIG. 2B, probabilistic shaping is circularly symmetric, with the probability being dependent on the energy of the symbol. For example, all symbols at a same first distance from the center of the constellation have the same probability. In the illustrated example, probabilistic shaping has been applied to the 16-QAM constellation to boost the relative probability of the four innermost symbols (when compared to a uniform distribution), and to decrease the probability of the other symbols. As a result of the shaping, eight symbols at a same second distance from the center of the constellation have the same energy and corresponding probability as each other, both of which are smaller than those of the four innermost symbols. The four outermost symbols at a same third distance from the center of the constellation (shown in FIG. 2B as the corner symbols in probability distribution diagram 201) have the same energy and corresponding probability as each other, and that probability is the smallest of those for the symbols in the constellation.

In an extreme case of probabilistic shaping for 16-QAM, the innermost four symbols might each have a probability of 0.25, and all other symbols might have a probability of zero. This extreme case represents the lowest possible entropy of 2 bits/symbol, which corresponds to a QPSK modulation format. In this case, as shown in the equations for calculating entropy above, the number of bits/symbol is smaller than that of uniform 16-QAM. Note, however, that in the example illustrated in FIG. 2B, none of the symbols has a probability of zero. Therefore, the lowest possible entropy of 2 bits/symbol will not be achieved, in this example. Note that by controlling the probability, the actual data rate for transmitting the information encoded in an optical signal may also be controlled.

As will be described in further detail herein, methods and systems are disclosed for probabilistic constellation shaping using low rate loss bit-level distribution matchers in optical transport networks, such as optical transport network 101. The use of the low rate loss bit-level distribution matchers described herein may result in reduced rate loss compared to constant modulus bit-level distribution matchers while achieving comparable probabilistic shaping.

Figure 3:
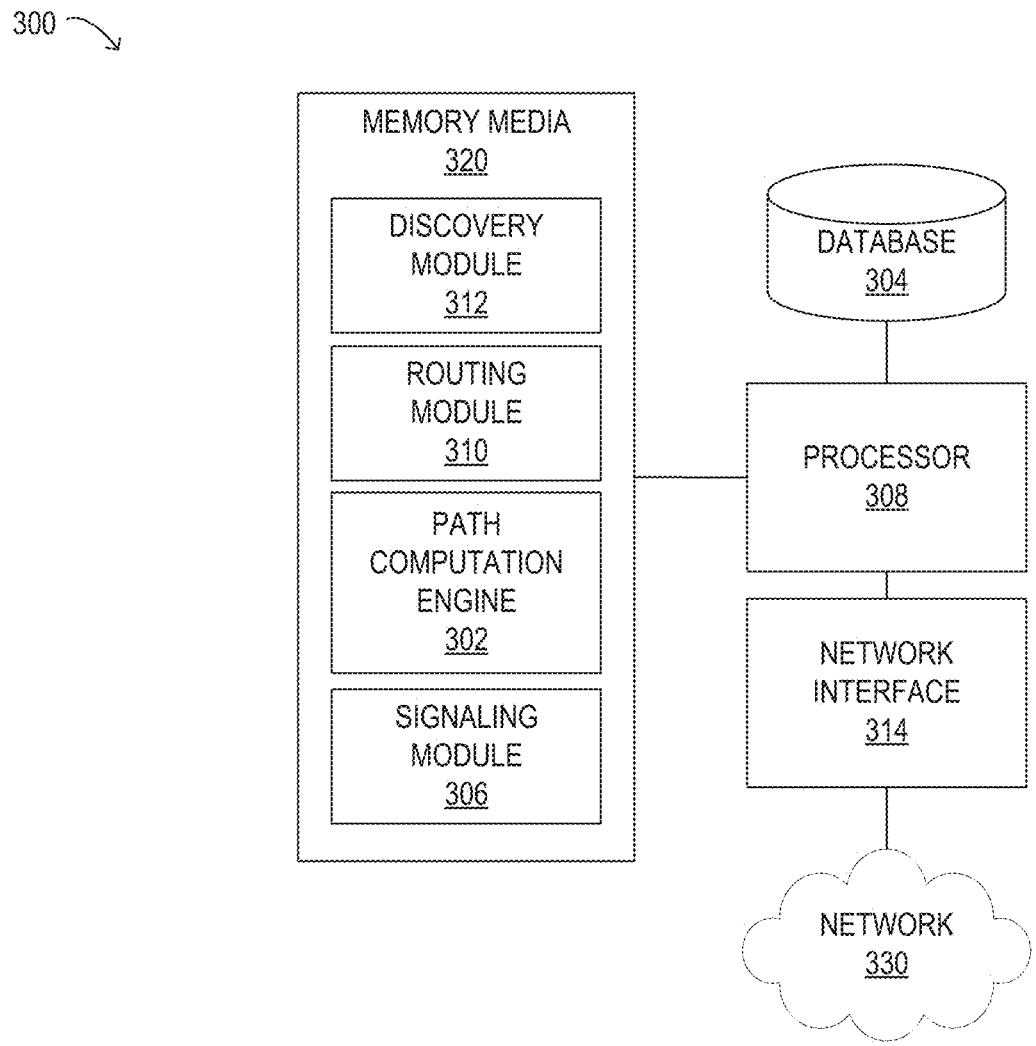
FIG. 3 is a block diagram of selected elements of an embodiment of network management system 300 for implementing control plane functionality in optical networks.

Referring now to FIG. 3, a block diagram of selected elements of an embodiment of network management system 300 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by network management system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service.

As shown in FIG. 3, network management system 300 includes processor 308 and memory media 320, which may store executable instructions (i.e., executable code) that may be executable by processor 308, which has access to memory media 320. Processor 308 may execute instructions that cause network management system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312 and routing module 310.

Also shown included with network management system 300 in FIG. 3 is network interface 314, which may be a suitable system, apparatus, or device operable to serve as an interface between processor 308 and network 330. Network interface 314 may enable network management system 300 to communicate over network 330 using a suitable transmission protocol or standard. In some embodiments, network interface 314 may be communicatively coupled via network 330 to a network storage resource. In some embodiments, network 330 represents at least certain portions of optical transport network 101. In certain embodiments, network 330 may include at least certain portions of a public network, such as the Internet. Network 330 may be implemented using hardware, software, or various combinations thereof.

In certain embodiments, the control plane may be configured to interface with a person (i.e., a user) and receive data about the signal transmission path. For example, the control plane may also include and/or may be coupled to one or more input devices or output devices to facilitate receiving data about the signal transmission path from the user and outputting results to the user. The one or more input and output devices (not shown) may include, but are not limited to, a keyboard, a mouse, a touchpad, a microphone, a display, a touchscreen display, an audio speaker, or the like. Alternately or additionally, the control plane may be configured to receive data about the signal transmission path from a device such as another computing device or a network element (not shown in FIG. 3), for example via network 330.

As shown in FIG. 3, in some embodiments, discovery module 312 may be configured to receive data concerning an optical signal transmission path in an optical network and may be responsible for discovery of neighbors and links between neighbors. In other words, discovery module 312 may send discovery messages according to a discovery protocol, and may receive data about the optical signal transmission path. In some embodiments, discovery module 312 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 3, routing module 310 may be responsible for propagating link connectivity information to various nodes within an optical network, such as optical transport network 101. In particular embodiments, routing module 310 may populate database 304 with resource information to support traffic engineering, which may include link bandwidth availability. Accordingly, database 304 may be populated by routing module 310 with information usable to determine a network topology of an optical network.

Path computation engine 302 may be configured to use the information provided by routing module 310 to database 304 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 302 may consider the interplay between the transmission degradation factors. In various embodiments, path computation engine 302 may generate values for specific transmission degradation factors. Path computation engine 302 may further store data describing the optical signal transmission path in database 304.

In FIG. 3, signaling module 306 may provide functionality associated with setting up, modifying, and tearing down end-to-end networks services in optical transport network 101. For example, when an ingress node in the optical network receives a service request, the control plane may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

In operation of network management system 300, path computation engine 302, or another entity or module, may provide path information associated with a given optical path, such as a distance, a number and type of optical channels to be transmitted, a fiber type, and a dispersion map. For example, signaling module 306, or another entity or module, may receive the path information and may decide on a type of modulation format and whether or not to use constellation shaping for any of the optical channels transmitted over the optical path. In order to activate or deactivate constellation shaping, signaling module 306 may send a first command to each transmitter for each of the optical channels, respectively. Then, signaling module 306 may send a second command to each receiver corresponding to each transmitter to activate or deactivate symbol-level or bit-level constellation shaping. Transmitters and receivers having universal programmable transponder functionality may receive the commands from signaling module 306 and may then activate or deactivate transmission of the optical channels using constellation shaping. In at least some embodiments of the optical transmission systems described herein, the transmitters may include low rate loss bit-level distribution matchers and the receivers may include low rate loss bit-level distribution de-matchers.

Figure 4:
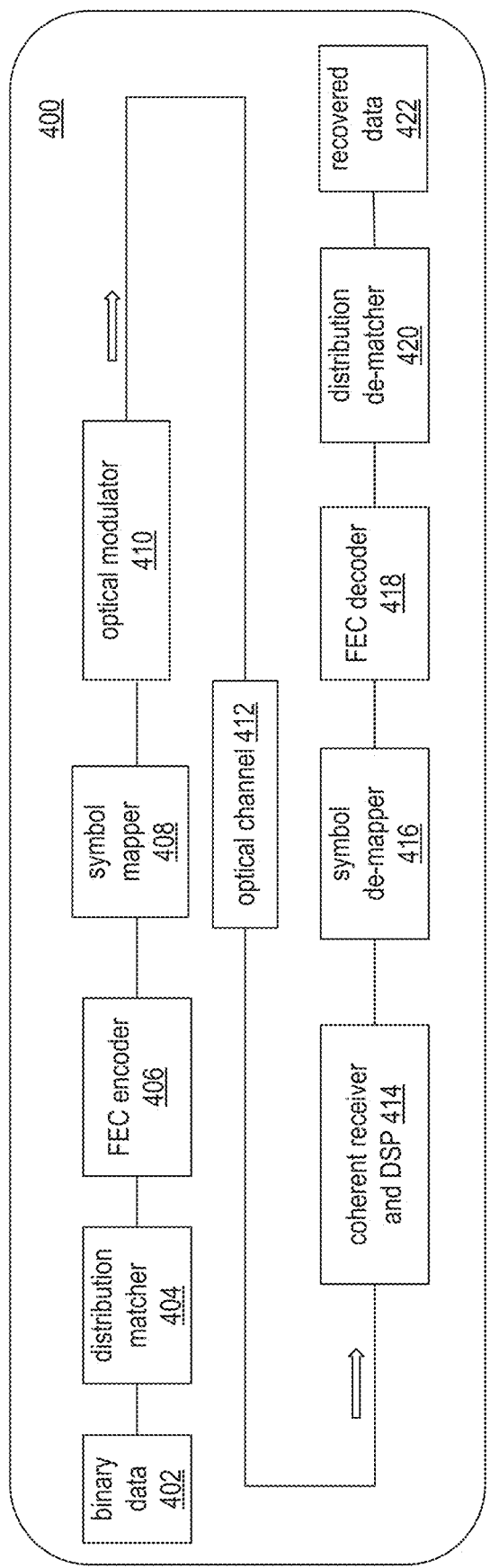
FIG. 4 is a schematic diagram illustrating selected elements of an example embodiment of an optical transmission system configured to apply symbol-level probabilistic shaping to one or more WDM channels in an optical network.

FIG. 4 is a schematic diagram illustrating selected elements of an example optical transmission system 400 configured to apply symbol-level probabilistic shaping to one or more WDM channels in an optical network. In the illustrated example, transmission system 400 includes elements similar to those of a conventional transmitter/receiver including, on the transmitter side, binary data 402 that is provided to optical transmission system 400 for transmission, forward error correction (FEC) encoder 406, symbol mapper 408, and optical modulator 410, an optical channel 412 comprising a suitable transmission media, and, on the receiver side, coherent receiver and DSP element 414, symbol de-mapper 416, and FEC decoder 418.

In order to apply probabilistic shaping, transmission system 400 also includes distribution matcher 404 on the transmitter side and distribution de-matcher 420 on the receiver side. The matcher may ensure sure that the center constellation points have a higher probability of occurrence than the edge constellation points. For example, distribution matcher 404 may be configured to control the probability of occurrence of certain constellation points on the transmitter side to shape the distribution of the constellation points, and distribution de-matcher 420 may be configured to reverse the probabilistic shaping process.

In optical transmission system 400, distribution matcher 404 receives the binary data 402 and generates data that is modified to achieve a particular probability profile based, for example, on a target probability distribution. Following distribution matcher 404, FEC encoder 406 and symbol mapper 408 may add forward error correcting encodings and map portions of binary data 402 (now with probabilities shaped by distribution matcher 404) to respective symbols before providing outputs to optical modulator 410 for transmission over optical channel 412. In the illustrated example, coherent receiver and DSP 414 may, using de-mapper 414, retrieve the modified and mapped portions of binary data 402 that were provided to optical modulator 410 and transmitted over optical channel 412. Subsequently, this binary data may be processed by FEC decoder 418 and distribution de-matcher 420 to recover the originally received binary data, shown as recovered data 422.

In optical transmission system 400, coherent receiver and DSP element 414 may include any or all of an I/Q imbalance compensation element, a chromatic dispersion compensation element, an adaptive equalizer, a polarization de-multiplexer, a frequency offset compensation element, a carrier phase recovery element, and/or a cycle slip compensation element.

In one example, probabilistic constellation shaping may be applied in a transponder configured to transmit an optical signal using 64-QAM. By apply probabilistic shaping, the spectral efficiency can vary from 64-QAM to QPSK (e.g., from 6 bits per symbol per polarization to 2 bits per symbol per polarization) with very fine tuning. In some embodiments, the spectral efficiency may be varied in increments of less than one bit per symbol. For example, instead of the spectral efficiency being configurable with values of just 6 or 5 bits per symbol, the spectral efficiency may be configurable with values of 5.1, 5.5, or 5.9 bits per symbol, as an example. In some embodiments, using distribution matcher 404 and distribution de-matcher 420, one transponder may be able to cover the whole range of spectral efficiency between 2 bits per symbol and 6 bits per symbol.

Symbol-level distribution matching based on constant composition distribution matchers is complex and may not be practical for real time processing. Recently, bit-level distribution matchers have been proposed to reduce the complexity of constant composition distribution matchers for probabilistic shaping by parallelizing the process in multiple bit-levels. In these previously proposed bit-level distribution matchers, each separate bit stream is based on constant composition distribution matching. Unlike in optical transmission systems that use symbol-level distribution matching for probabilistic shaping, in which a distribution matcher outputs a binary labeled sequence of symbol amplitudes with a target symbol distribution and a FEC encoder adds sign bits, in optical transmission systems that use bit-level distribution matching for probabilistic shaping, each of multiple parallel bit-level distribution matchers may output a shaped bit sequence in which each output block includes a number of bits having a value of '1' that meets a respective target number of '1' bits for that bit-level distribution matcher, after which a FEC encoder adds sign bits to the multiplexed outputs of the bit-level distribution matchers. In this way, the distribution matching function is parallelized using multiple bit-level distribution matchers that are simpler than symbol-level distribution matchers.

These bit-level distribution matchers transform random incoming binary bit streams to target symbol probabilities for better SNR performance. However, rate loss, in terms of the difference between the entropy calculated from the probabilities of the symbols and the actual data rate delivered based on the finite block size of the distribution matcher, can be significant with these distribution matchers, especially for relatively short output block sizes. Increasing the output block size can reduce the rate loss, measured in bits per symbol, in these distribution matchers, but also significantly increases the complexity of these distribution matchers.

In at least some embodiments, the optical transmission systems described herein include low rate loss bit-level distribution matchers for probabilistic constellation shaping with short output block lengths. These low rate loss distribution matchers may have reduced complexity compared to existing symbol-level constant composition distribution matchers due to parallelizing the matcher process at the bit level, rather than applying the matcher process at the symbol level. As described in more detail herein, a method, based on a bounded-energy trellis, for selecting a subset of codeword combinations to be mapped to input bits by each bit-level distribution matcher may allow the probability of a given bit value to be controlled while increasing the output combinations of codewords to reduce rate loss.

Figure 5A:
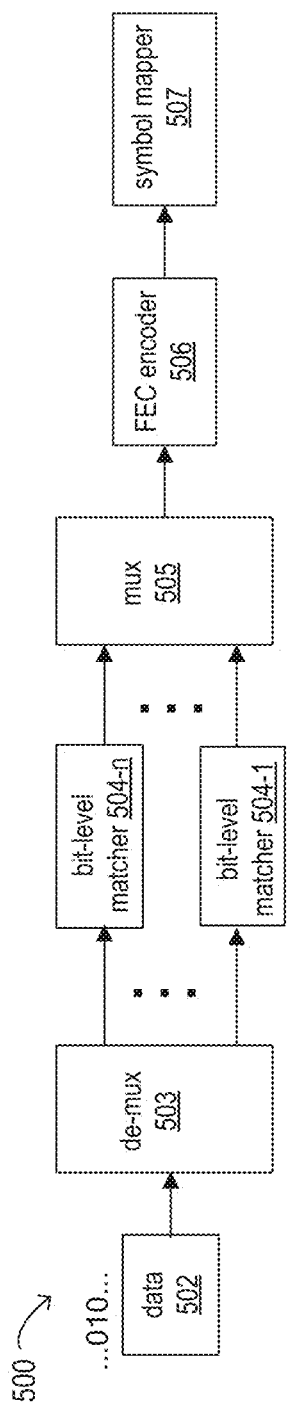
FIG. 5A is a schematic diagram illustrating selected elements of a transmitter portion of an example optical transmission system configured to apply probabilistic constellation shaping using a low rate loss bit-level distribution matcher, according to some embodiments.

FIG. 5A is a schematic diagram illustrating selected elements of a transmitter portion 500 of an example optical transmission system configured to apply probabilistic constellation shaping using a bit-level distribution matcher, according to some embodiments. In the illustrated embodiment, transmitter 500 includes a de-multiplexer 503, multiple bit-level distribution matchers 504, a multiplexer 505, a FEC encoder 506, and a symbol mapper 507. The output of symbol mapper 507 may be provided to an optical modulator for transmission over an optical channel.

As a binary bit steam, shown as data 502, is received at de-multiplexer 503, individual bits are routed to respective ones of the bit-level distribution matchers 504 in sequence. For example, the first received bit representing the least significant bit of the first n consecutive bits may be routed to matcher 504-1, the second received bit may be routed to matcher 504-2, and so on up to the $n^{th}$ received bit representing the most significant bit of the first n consecutive bits, which is routed to matcher 504-n. The sequence repeats for each n consecutive bits with the least significant bit of the n consecutive bits being routed to matcher 504-1, the next bit being routed to matcher 504-2, and so on. Combinations of bit values routed to each bit-level distribution matcher may be mapped by the bit-level distribution matchers to codewords that collectively represent a probability for a given one of multiple possible symbol amplitudes, according to a target probability distribution.

For example, each bit-level distribution matcher may assign a respective codeword to each received input block of a given number of input bits such that the codeword includes a number of binary bits of a given value that is dependent on a predetermined target probability distribution for input blocks received by the matcher. In at least some embodiments, the predetermined target probability distributions may be different for different bit-level distribution matchers. In the descriptions that follow, the codewords output by the bit-level distribution matcher that receives the least significant bit of each n consecutive bits in the incoming binary bit stream may be designated as codewords B1, the codewords output by the bit-level distribution matcher that receives the next bit of each n consecutive bits in the incoming binary bit stream may be designated as codewords B2, and so on, such that the codewords output by the bit-level distribution matcher that receives the most significant bit of each n consecutive bits in the incoming binary bit stream may be designated as codewords Bn.

Figure 5B:
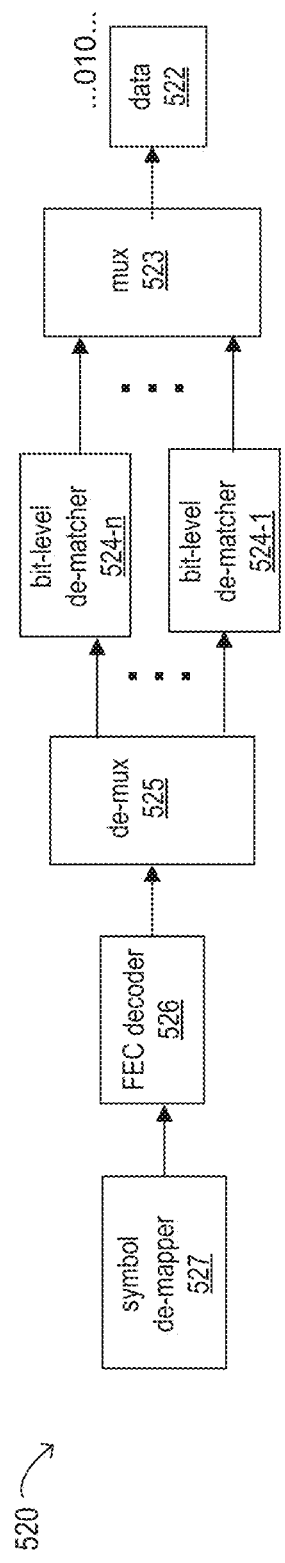
FIG. 5B is a schematic diagram illustrating selected elements of a receiver portion of an example optical transmission system configured to recover information from received optical signals using a bit-level distribution de-matcher, according to some embodiments.

FIG. 5B is a schematic diagram illustrating selected elements of a receiver portion 520 of an example optical transmission system configured to recover data 502 from received optical signals using a bit-level distribution de-matcher, according to some embodiments. In the illustrated embodiment, receiver 520 includes a symbol de-mapper 527, a FEC decoder 526, a de-multiplexer 525, multiple bit-level distribution de-matchers 524, and a multiplexer 523. The input to symbol de-mapper 527 may be an optical signal received from a transmitter portion 510 of the optical transmission system over an optical channel. In this example, the output of multiplexer 523 includes information corresponding to binary data 502 and recovered from received optical signals by receiver portion 520. Here, the shaped bit sequences are recovered by symbol de-mapper 527 and the parity bits added by the FEC encoder of the transmitter are removed by FEC decoder 526, after which the bit-level distribution de-matchers 524 recover the information in the input blocks from the codewords and, after multiplexing the bits of the input blocks back together at multiplexer 523, the recovered information is output as data 522.

Figure 6:
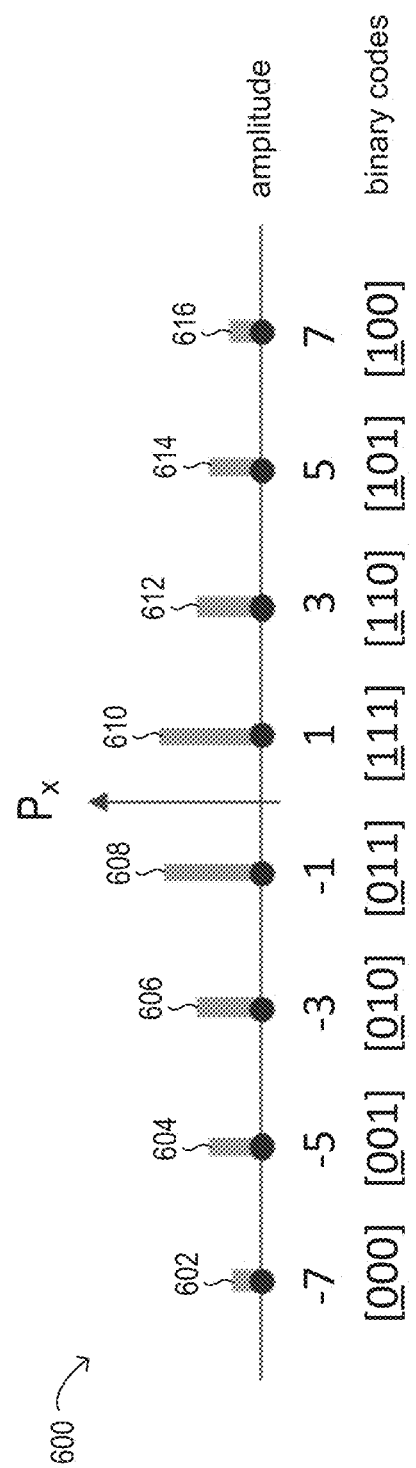
FIG. 6 illustrates an example symbol probability distribution for probabilistic amplitude shaping, according to some embodiments.

FIG. 6 illustrates an example symbol probability distribution 600 for probabilistic constellation shaping for 8-ASK. In this example, there are four possible amplitudes, which are represented by two least significant bits, while the most significant bits represent sign bits added by a FEC encoder of the transmitter. The height of each bar represents the probability of each amplitude, with the probability distribution being symmetric for sign bit values of '0' and '1'. For example, the height of bar 602 indicates the probability for a symbol −7, which is the same as the height of bar 616, which indicates the probability for a symbol +7. Similarly, the height of bar 604 indicates the probability for a symbol −5, the height of bar 614 indicates the probability for a symbol +5, the height of bar 606 indicates the probability for a symbol −3, the height of bar 612 indicates the probability for a symbol +3, the height of bar 608 indicates the probability for a symbol −1, and the height of bar 610 indicates the probability for a symbol +1.

In this example, the number of bits in each codeword B2 having a value of '1' is seven out of ten bits and the number of bits in each codeword B1 having a value of '1' is six out of ten bits. Therefore, the probabilities of each combination of [B2 B1] may be as follows: P[1,1]=0.42, P[1,0]=0.7*(1−0.6)=0.28, P[0,1]=0.18, P[0,0]=0.12. In this example, the bit-level distribution matchers that output the codewords B1 and B2 could be implemented using constant composition distribution matching, as in previously proposed bit-level distribution matchers.

As previously noted, rate loss, in terms of the difference between the entropy calculated from the probabilities of the symbols and the actual data rate delivered based on the finite block size of the distribution matcher, can be significant with bit-level distribution matchers implemented using constant composition distribution matching, especially for relatively short output block sizes. In one example, the probabilities of bit '1' in two bit streams for four amplitudes are $P_1$ (B2)=5/6 and $P_1$ (B1)=4/6, and the output block size is 6 bits. In this example, the symbol probabilities for each combination are Px={0.556, 0.278, 011, 0.056}. However, there are two factors that contribute to rate loss in bit-level distribution matchers. One factor is that the possible combinations of the outcome are limited due to the enforcement of a constant modulus, i.e., the number of output bits with a value of '1' is fixed in each output block for each bit stream.

In this example, there are six possible codewords for B2 having five bits with a value of '1' out of six bits: 011111, 101111, 110111, 111011, 111101, and 111110. There are fifteen possible codewords for B1 having four bits with a value of '1' out of six bits: 001111, 010111, 011011, 011101, 011110, 100111, 101011, 101101, 101110, 110011, 110101, 110100, 111001, 110101, and 111100. Therefore, there are ninety different possible combinations of [B2 B1], resulting in a data rate of Log 2 (90)/6=1.08 bit/symbol. However, the entropy calculated based on the symbol probabilities is H=−Σ(Px*log 2(Px))=1.57 bit/symbol. The rate loss in this example is the difference between the data rate of 1.08 bit/symbol in implementation and an entropy of 1.57 bit/symbol calculated based on the symbol probabilities.

A second factor contributing to rate loss with bit-level distribution matchers implemented using constant composition distribution matching is the discrete nature of bits, i.e. a transmitter cannot transmit a fractional bit. Therefore, the number of input bits should be: floor(log 2(6)) bits for B2, and floor(log 2(15)) bits for B1. Thus, the actual data rate is (2+3)/6=0.83 bit/symbol.

In this example, given an input block size of two bits for the bit-level distribution matcher that outputs B2, of the six possible codewords for B2 having five bits with a value of '1' out of six bits, only four can be used. The other two of the six possible codewords cannot be used because there are only four possible combinations of values for the two input bits. However, the bit-level distribution matcher cannot serve three input bits because there are only six possible codewords, meaning there are not enough codewords to map a different codeword to each of the eight possible combinations of values for three input bits. For example, input bit values [0 0] may be mapped to a B2 codeword [011111], input bit values [0 1] may be mapped to a B2 codeword [101111], input bit values [1 0] may be mapped to a B2 codeword [110111], and input bit values [1 1] may be mapped to a B2 codeword [111011], leaving available B2 codewords 111101 and 111110 unused. As previously noted, rate loss in bit-level distribution matchers that implement constant composition distribution matching can be reduced by increasing the output block size, but this may significantly increase the implementation complexity.

In at least some embodiments, the low rate loss bit-level distribution matchers described herein may use the average probability of a given bit value among mapped codewords, rather than a constant probability, to meet a target probability distribution, thus increasing the number of possible combinations of bit values available for the codewords output by the bit-level distribution matchers. For example, in optical transmission systems that include these the low rate loss bit-level distribution matchers, the number of bits having the bit value '1' may not be constant in each output block, but the average number of bits having the bit value '1' among the available codewords may meet the target probability distribution for a given bit-level distribution matcher.

Figure 8A:
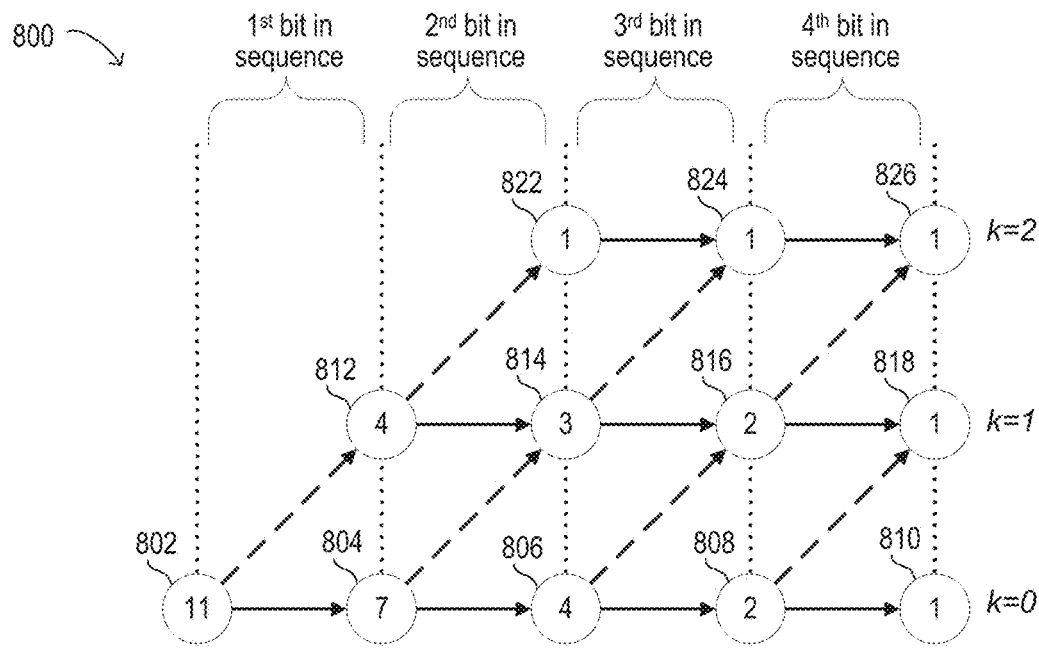
FIG. 8A illustrates the use of a bounded-energy trellis to index bit sequences having four output bits in which the maximum number of bits having a given bit value is a predetermined maximum value, according to some embodiments.
Figure 8B:
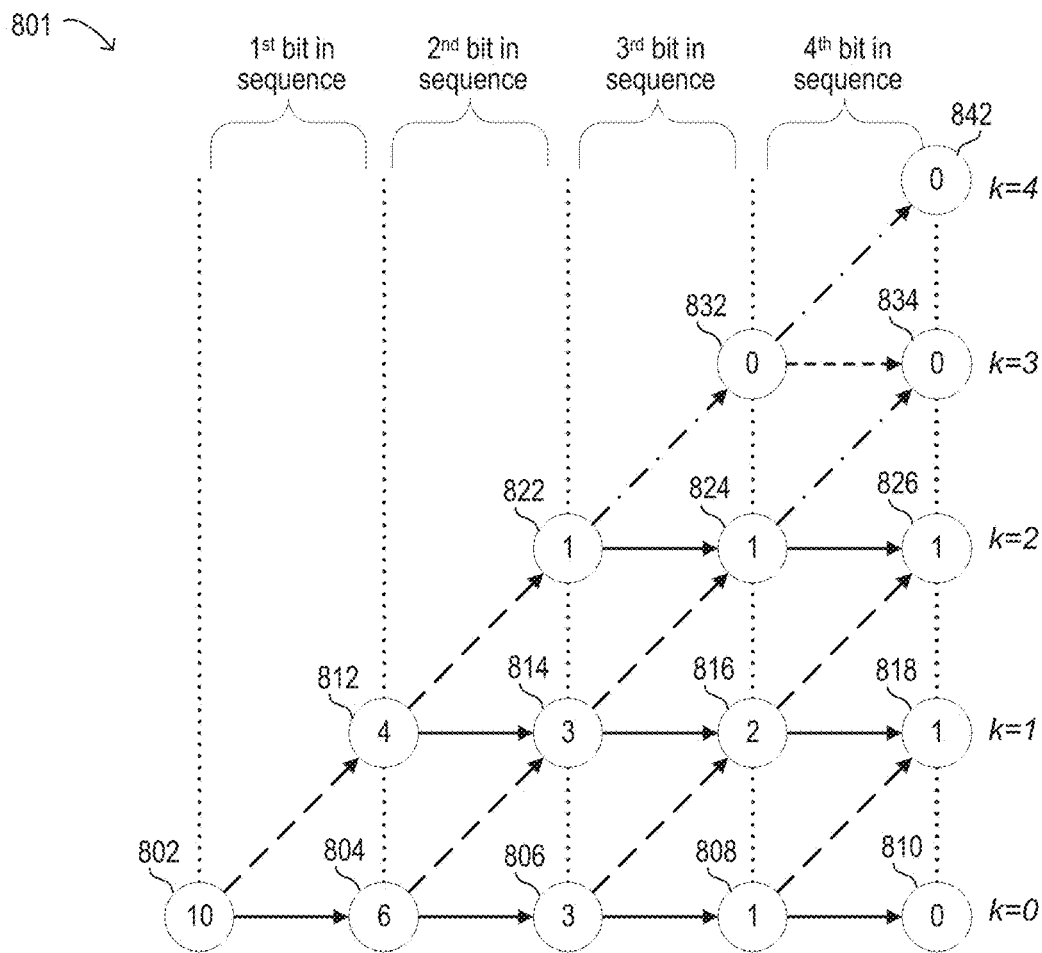
FIG. 8B illustrates the use of a bounded-energy trellis in working with a subset of possible output bit sequences to control probability.

As previously noted, a method based on a bounded-energy trellis may be used to select a subset of codeword combinations to be mapped to input bits by each bit-level distribution matcher. As illustrated in FIG. 8A and described below, the method may be used to match input bit sequences to output codewords in bit-level distribution matchers of a transmitter or may be used to match received code words to input bit sequences in bit-level distribution de-matchers of a receiver. As illustrated in FIG. 8B and described below, the method may be used to select a subset of bit value combinations for mapped codewords in a manner that controls the probability of a given bit value, such as a bit value of '1' or a bit value of '0', while increasing the number of available output combinations for the codewords to reduce rate loss as compared to the rate loss of constant modulus bit-level distribution matchers.

Figure 7:
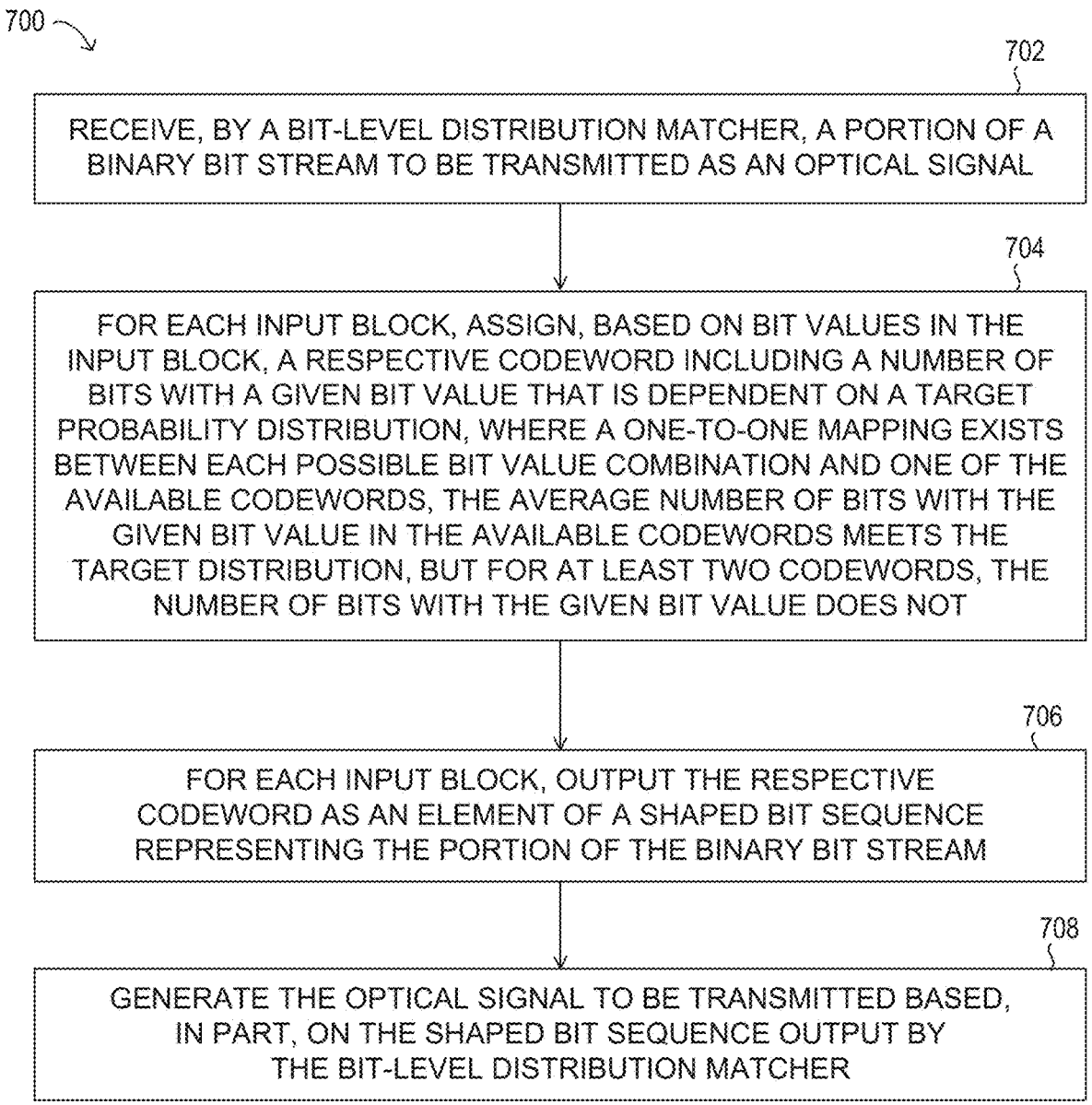
FIG. 7 is a block diagram of selected elements of an embodiment of method for probabilistic constellation shaping using a low rate loss bit-level distribution matcher depicted in flowchart form.

Referring now to FIG. 7, a block diagram of selected elements of an embodiment of method 700 for probabilistic constellation shaping using a low rate loss bit-level distribution matcher, as described herein, is depicted in flowchart form. Method 700 may be performed using optical transport network 101. In some embodiments, network management system 300 illustrated in FIG. 3 may be used to obtain path information as well as send commands to optical transmitters and optical receivers to configure them for probabilistic constellation shaping using a low rate loss bit-level distribution matcher, as described herein. Although method 700 is described in the singular in terms of a low rate loss bit-level distribution matcher among a plurality of low rate loss bit-level distribution matcher, it will be understood that operations in method 700 may be duplicated, in parallel, for any plurality of low rate loss bit-level distribution matchers for an optical transmitter. It is noted that certain operations described in method 700 may be optional or may be rearranged in different embodiments.

Method 700 may begin at 702 by receiving, by a bit-level distribution matcher of a transmitter, a portion of a binary bit stream to be transmitted as an optical signal. For example, the bit-level distribution matcher may receive, for each input block of a binary bit stream to be transmitted as an optical signal, the bit in a particular position within the input block.

At 704, method 700 includes, for each input block of consecutively received binary bits in the portion of the binary bit stream having a predetermined input block size, assigning, based on values of the consecutively received binary bits in the input block, a respective codeword for the input block having a predetermined output block size, the respective codeword including a number of binary bits having a given bit value that is dependent on a predetermined target probability distribution for input blocks received by the bit-level distribution matcher. In at least some embodiments, a one-to-one mapping exists between each combination of bit values possible to be included in an input block received by the bit-level distribution matcher and a respective codeword to be assigned to input blocks containing the combination of bit values. Unlike in bit-level distribution matchers that enforce a constant modulus, for at least two of the possible combinations of bit values, the respective codeword to be assigned to input blocks containing the combination of bit values may include a number of binary bits having the given bit value that is different than a number of binary bits having the given bit value that corresponds to the predetermined target probability distribution for input blocks received by the bit-level distribution matcher. However, for all of the possible combinations of bit values, the average number of binary bits having the given bit value in the respective codewords to be assigned to input blocks containing the combinations of bit values may be equal to the number of binary bits having the given bit value that corresponds to the predetermined target probability distribution for input blocks received by the bit-level distribution matcher.

At 706, method 700 includes, for each input block, outputting the respective codeword as an element of a shaped bit sequence representing the portion of the binary bit stream received by the bit-level distribution matcher.

At 708, the method includes generating the optical signal to be transmitted based, in part, on the shaped bit sequence output by the bit-level distribution matcher. For example, the optical signal to be transmitted may also be based on the shaped bit sequences output by one or more additional bit-level distribution matchers that operate in parallel to apply probabilistic constellation shaping in the optical transmission system.

In at least some embodiments, the operations shown as 702 through 708 may be repeated continuously as the portion of the binary bit stream is received at the transmitter. In addition, the operations shown as 702 through 708 may be performed by each of the one or more additional bit-level distribution matchers that operate in parallel to apply probabilistic constellation shaping in the optical transmission system as they receive other portions of the binary bit stream.

In one example in which the number of available codewords for a bit-level distribution matcher is increased by adopting the average probability of a given bit value, rather than a constant probability, the probabilities of bit '1' in two bit streams for four amplitudes are $P_1$ (B2)=5/6 and $P_1$ (B1)=4/6, and the output block size is 6 bits, as in the previous example. In addition to the six potential codewords listed in the previous example that each include five bits having a value of '1', two or more codewords in which the average number of bits having a value of '1' is five may be considered for assignment to input blocks by the bit-level distribution matcher. For example, by adding codewords 111111 and 001111 to the list of available B2 codewords, for a total of eight codewords, the bit-level distribution matcher for B2 can serve three input bits having eight possible combinations of bit values with a one-to-one mapping between input blocks and output blocks. Similarly, two additional codewords in which average number of bits having a value of '1' is four may be considered for assignment to input blocks by the bit-level distribution matcher for B1. For example, by adding codewords 111101 and 100011 to the list of available B1 codewords, for a total of seventeen codewords, the bit-level distribution matcher for B1 can serve four input bits having sixteen possible combinations of bit values with a one-to-one mapping between input blocks and output blocks.

In this example, the overall probability of a bit value of '1' for B2 is still 5/6 and the overall probability of a bit value of '1' for B1 is still 4/6 but the number of possible combinations [B2 B1] is 136, resulting in an increased data rate of Log 2(136)/6=1.18 bit/symbol, rather than the 1.08 bit/symbol data rate possible with a constant modulus. As noted above, the number of input bits that can be served by respective bit-level distribution matchers is floor(log 2 (8))=3 bits for B2, and floor(log 2(17))=4 bits for B1. In this example, the actual data rate may be (3+4)/6=1.16 bit/symbol, which is much greater than the actual data rate of 0.83 bit/symbol, resulting in a significantly reduced rate loss for the transmitter. This example illustrates that the rate loss in the bit-level distribution matchers described herein may be reduced, due to the increased number of potential codewords made available by removing the constant modulus constraint, while achieving probability shaping that is comparable to that of bit-level distribution matchers that enforce a constant modulus.

For some optical transmission systems that include a low rate loss bit-level distribution matcher, such as those described herein, a bounded-energy trellis representation of potential output block elements may be used to identify all possible codewords of a given output block size that include no more than a predetermined maximum number of bits having a given bit value. A subset of the identified codewords may be selected for assignment to input blocks by the bit-level distribution matcher such that the average number of binary bits having the given bit value in the selected subset of identified codewords is equal to the number of binary bits having the given bit value that corresponds to a predetermined target probability distribution for the bit-level distribution matcher. However, individual codewords in the selected subset of identified codewords may have a different number of binary bits having the given bit value. Once a suitable subset of codewords has been selected, the bit-level distribution matcher may be configured to assign a respective codeword for each input block according to a one-to-to mapping between each possible combination of input bit values and a respective codeword in the selected subset. In at least some embodiments, different bit-level distribution matchers among multiple parallel level distribution matchers may have different predetermined target probability distributions.

In some embodiments, a low rate loss bit-level distribution matcher of a transmitter, such as those described herein, may receive an input block representing a portion of an incoming bit stream and convert the binary values in the input block to an unsigned integer or index, i.e., a decimal number. Subsequently, an output bit sequence, which represents an element of a shaped bit sequence, corresponding to the index may be determined based on the bounded-energy trellis using lexicographical ordering.

In some embodiments, a low rate loss bit-level distribution de-matcher of a receiver, such as those described herein, may receive shaped bit sequences and convert them to a corresponding index based on the bounded-energy trellis. Subsequently, the index may be converted to binary values or an output bit stream.

FIG. 8A illustrates the use of an example bounded-energy trellis 800 to index bit sequences having four output bits in which the maximum number of bits having a given bit value is a predetermined maximum value, according to some embodiments. More specifically, in the illustrated example, the bounded-energy trellis 800 may be used to index all possible bit sequences that have four output bits for which the maximum number of bits having the value '1' is two. The bounded-energy trellis 800 is created as a graph including up to five nodes, representing one more than the target number of output bits, along the horizontal axis, and three nodes stacked vertically, representing one more than the maximum number of bits having the value '1'. The arrows between the nodes represent output bits, where a dashed arrow between two nodes indicates a bit value of '1' and a solid arrow between two nodes indicates a bit value of '0'. The numerical values shown for each node represent the number of possible paths from the node to a node in the right most column.

After initializing the values shown for each node in the rightmost column of the trellis (shown as nodes 810, 818, and 826) to '1', the values shown in each other node may be calculated by adding the values of all nodes to the right of the node that are reachable by one of the arrows. For example, the value for node 808 is equal to the sum of the values for nodes 810 and 818, the value for node 816 is equal to the sum of the values for nodes 826 and 818, the value for node 824 is equal to the value for node 826, the value for node 806 is equal to the sum of the values for nodes 808 and 816, the value for node 814 is equal to the sum of the values for nodes 816 and 824, the value for node 822 is equal to the values for node 824, the value for node 804 is equal to the sum of the values for nodes 806 and 814, the value for node 812 is equal to the sum of the values for nodes 814 and 822, and the value for node 802 is equal to the sum of the values for nodes 804 and 812. The value of node 802 indicates that there are eleven possible codewords having four output bits for which the maximum number of bits having the value '1' is two.

In this example, once the bounded-energy trellis 800 is constructed, an index value associated with an output bit sequence represented by a path from node 802 at the bottom left of trellis 800 to one node in each of the columns to the right may be determined by adding the values of the nodes immediately (horizontally) to the right of the nodes from which a dashed arrow forms the path from left to right. For example, an output bit sequence corresponding to the path from node 802 to node 804 to node 806 to node 808 to node 810 may correspond to an output bit sequence of [0 0 0 0], since only sold arrows lie between the nodes on this path. The index value for this sequence is 0, since there are no dashed arrows along this path. In another example, an output bit sequence corresponding to the path from node 802 to node 804 to node 814 to node 816 to node 826 may correspond to an output bit sequence of [0 1 0 1], and the index value may be calculated as the sum of the values for nodes 806, which is to the right of node 804, and node 808, which is to right of node 816. In this case, the index value corresponding to the output bit sequence [0 1 0 1] is calculated as 4+1=5.

Conversely, once the bounded-energy trellis 800 is constructed, it may be used to identify an output bit sequence from an index value. In the illustrated example, starting at node 802, a path is traversed toward the right side of trellis 800 based on the values of the nodes immediately (horizontally) to the right of the current node relative to the initial index value or relative to an updated index value. If the node to the right has a value that is greater than the index value, the path continues along the solid line horizontally and to the right. If the node to the right has a value that is less than or equal to the index value, the path continues along the dashed arrow upward and to the right and the index value is updated by subtracting the value of the node to the right of the current node.

In one example, if the index value is '0', the path may travel along the bottom of trellis 800 through nodes 804, 806, 808, and 810, since all of these nodes have values greater than '0'. This path, which includes only solid arrows between the nodes, corresponds to an output bit sequence of [0 0 0 0]. In another example, if the initial index value is '5', the path may travel from node 802 to node 804, since the value of node 804 is greater than the initial index value of '5'. The path may then travel from node 804 to node 814, since the value of node 806 is less than the initial index value. At this point the index value is updated by subtracting the value of the node to the right of node 804, or a value of '4', resulting in an updated index value of '1'. The path may then travel from node 814 to node 816, since the value of node 816 is greater than the updated index value of '1'. The path may then travel from node 816 to node 826, since the value of node 818 is not greater than the updated index value of '1'. In this example, the output bit sequence corresponding to an index value of '5' is represented in trellis 800 by the solid arrow to node 804, the dashed arrow to node 814, the solid arrow to node 816, and the dashed arrow to node 826, for an output bit sequence of [0 1 0 1].

In at least some embodiments, if each incoming input block containing random bits is converted to a respective unsigned integer (or index) value from 0 to 10, the average probability of bit '1' may be calculated as follows:

$$\frac{\sum_{k=0}^{K} k_N C_k}{N \sum_{k=0}^{K} {}_N C_k} = \frac{0_4^* C_0 + 1_4^* C_1 + 2_4^* C_2}{4*11} = \frac{16}{44} = 0.367$$

Here, N represents the output block size (i.e., the number of bits in each output block), K represents the maximum number of output bits in each output block having a value of '1', and k represents the number of output bit in a given output block having a value of '1'. In this example, the maximum possible number of input bits is 3=floor (log 2(11)) such that index values from 0 to 7 will be used. Therefore, the actual probability may be different. However, for bit-level distribution matchers with larger output block sizes, the formula above may be used to approximate the probability with reasonable accuracy.

In some embodiments, a trellis representation of potential output block elements may use inverted bits to determine output bit sequences based on an index value. For example, the probability that a bit has a value of '1' is equal to one minus the probability that the bit has a value of '0'. To use inverted bits, the dashed arrows in trellis 800 may represent output bits having a value of '0' and the solid arrows in trellis 800 may represent output bits having a value of '1'. In this example, the output bit sequence corresponding to an index value of '5' will include output bits [1 0 1 0], rather than [0 1 0 1], as in the previous example.

As previously noted, a subset of the codewords of the predetermined output block size and including no more than the predetermined maximum number of bits having a given value may be selected for assignment to input blocks by the bit-level distribution matcher such that the average number of binary bits having the given bit value in the selected subset of codewords is equal to the number of binary bits having the given bit value that corresponds to a predetermined target probability distribution for the bit-level distribution matcher.

FIG. 8B illustrates the use of a bounded-energy trellis 801 in working with a subset of possible output bit sequences to control probability, according to some embodiments. In other words, in some embodiments, a subset of possible output bit combinations may be chosen for a bit-level distribution matcher to meet the target probability distribution while increasing the number of codewords compared to a constant modulus bit-level distribution matcher.

In the illustrated example, trellis 801 includes nodes similar to those of trellis 800 shown in FIG. 8A, with the addition of nodes 832, 834, and 842. In this example, a subset of the nodes in the right most column, representing the number of bits in an output bit sequence having a value of '1', may be chosen. In this example, the unchosen right most node 810 at the bottom right is set to '0', thus removing it from trellis 801. In response, the possible numbers of paths from each node may be recalculated as shown for nodes 802, 804, 806, and 808. In this example, nodes in paths for which k=1 or 2 are chosen as subset, there are ten possible output combinations, and the maximum number of input bits for the bit-level distribution matcher may be calculated as floor(log 2(10))=3. Here, the path corresponding to index value 0 will be the path including output bits [0 0 0 1], and the probability of bit '1' may be calculated as follows:

$$\frac{\sum_{k \in chosen\ k}^{K} k_N C_k}{N \sum_{k=0}^{K} {}_N C_k} = \frac{1_4^* C_1 + 2_4^* C_2}{4*11} = \frac{15}{44} = 0.34$$

In another example, nodes in paths for which k=1 or 3 may be chosen as subset. In yet another example, if only nodes in paths for which k=2 are chosen, every output block will include two bits having a value of '1', with a 0.6 probability of bit '1' as a constant modulus bit-level distribution matcher. In this case, there will be $6={}_4C_2$ output codewords and the maximum number of input bit will be 2=floor(log 2 (6)).

In some embodiments, a trellis representation of potential output block elements for a given bit-level distribution matcher may, once constructed, be stored in a memory accessible by the given bit-level distribution matcher and used by the given bit-level distribution matcher during constellation shaping. In some embodiments, once index values for all possible combinations of input block bits and mappings between the index values and corresponding codewords have been determined for a given bit-level distribution matcher to meet a target probability distribution, these index values and corresponding codewords, or index-value-to-codeword mappings, may be stored in a memory accessible by the given bit-level distribution matcher and used by the given bit-level distribution matcher during constellation shaping. In some embodiments, multiple trellis representations may be constructed and stored for the use of given bit-level distribution matcher at different points in time, in accordance with changing constellation shaping parameters or requirements.

In some embodiments, network management system 300 illustrated in FIG. 3 may send commands to optical transmitters and optical receivers to configure low rate loss bit-level distribution matchers and de-matchers for probabilistic constellation shaping as described herein. The commands may include, for example, an indication of a particular trellis representation, or an indication of a particular set of index values and corresponding codewords, or index-value-to-codeword mappings, to be used in performing low rate loss bit-level distribution matching, in some embodiments.

Figure 9:
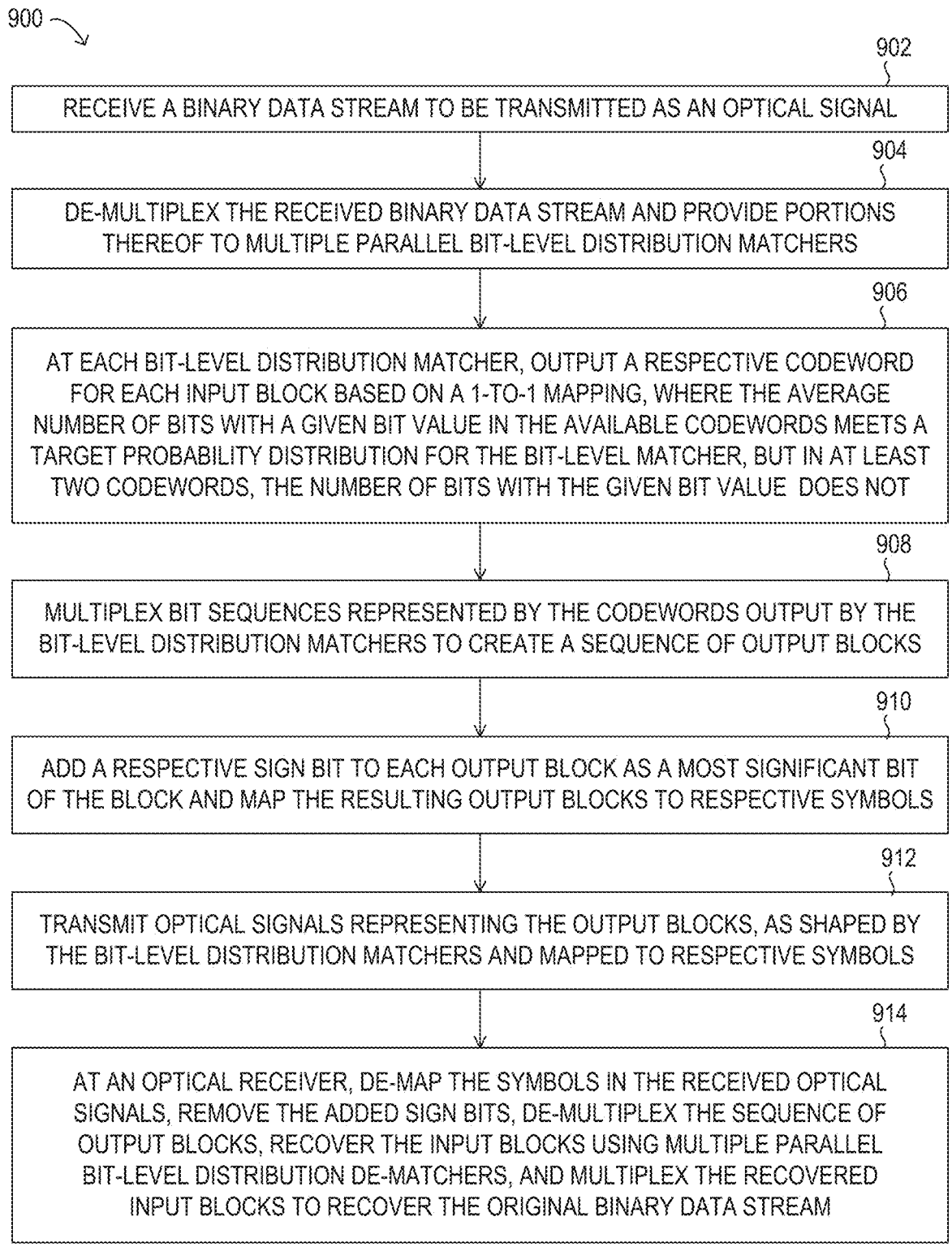
FIG. 9 is a block diagram of selected elements of an embodiment of method for probabilistic constellation shaping for optical networks using bit-level distribution matchers and de-matchers depicted in flowchart form depicted in flowchart form.

FIG. 9 is a block diagram of selected elements of an embodiment of method 900 for probabilistic constellation shaping for optical networks using bit-level distribution matchers and de-matchers depicted in flowchart form. Method 900 may be performed using optical transport network 101. In some embodiments, network management system 300 illustrated in FIG. 3 may be used to obtain path information as well as send commands to optical transmitters and optical receivers to configure them for probabilistic constellation shaping using low rate loss bit-level distribution matchers and de-matchers, as described herein. It is noted that certain operations described in method 900 may be optional or may be rearranged in different embodiments.

At 902, method 900 includes receiving a binary data stream to be transmitted as an optical signal over a transmission path.

At 904, the method includes de-multiplexing the received binary data stream and providing portions thereof to multiple parallel bit-level distribution matchers, as described above.

At 906, method 900 includes, at each bit-level distribution matcher, outputting a respective codeword for each received input block that includes a predetermined number of input bits, based on a 1-to-1 mapping. In at least some embodiments, the average number of bits with a given bit value in the available codewords meets a target probability distribution for the bit-level distribution matcher, but in at least two codewords, the number of bits with the given bit value does not meet the target probability distribution for the bit-level distribution matcher. As illustrated in FIG. 7 and described above, the assignment of respective codewords to input blocks by the multiple bit-level distribution matchers may be performed continuously and in parallel as the binary data stream is received at the transmitter.

At 908, method 900 includes multiplexing the bit sequences represented by the codewords output by the bit-level distribution matchers to create a sequence of output amplitudes, each including multiple bits.

At 910, the method includes adding, by a FEC encoder, a respective sign bit or parity bit, to each output amplitude as the most significant bit of the output amplitude and mapping the resulting output amplitudes to respective symbols.

At 912, method 900 includes transmitting optical signals representing the output blocks, as shaped by the bit-level distribution matchers and mapped to respective symbols over an optical channel. In at least some embodiments, the operations shown as 902 through 912 may be repeated continuously as the binary bit stream is received at the transmitter.

At 914, the method includes, at an optical receiver that receives the optical signals transmitted over the optical channel, de-mapping the symbols in the received optical signals, removing the added sign bits by FEC decoding, de-multiplexing the sequence of output blocks, recovering the input blocks using multiple parallel bit-level distribution de-matchers, and multiplexing the recovered input blocks to recover the original binary data stream. In at least some embodiments, these operations may be performed continuously as the optical receiver receives optical signals transmitted over the optical channel.

Figure 10:
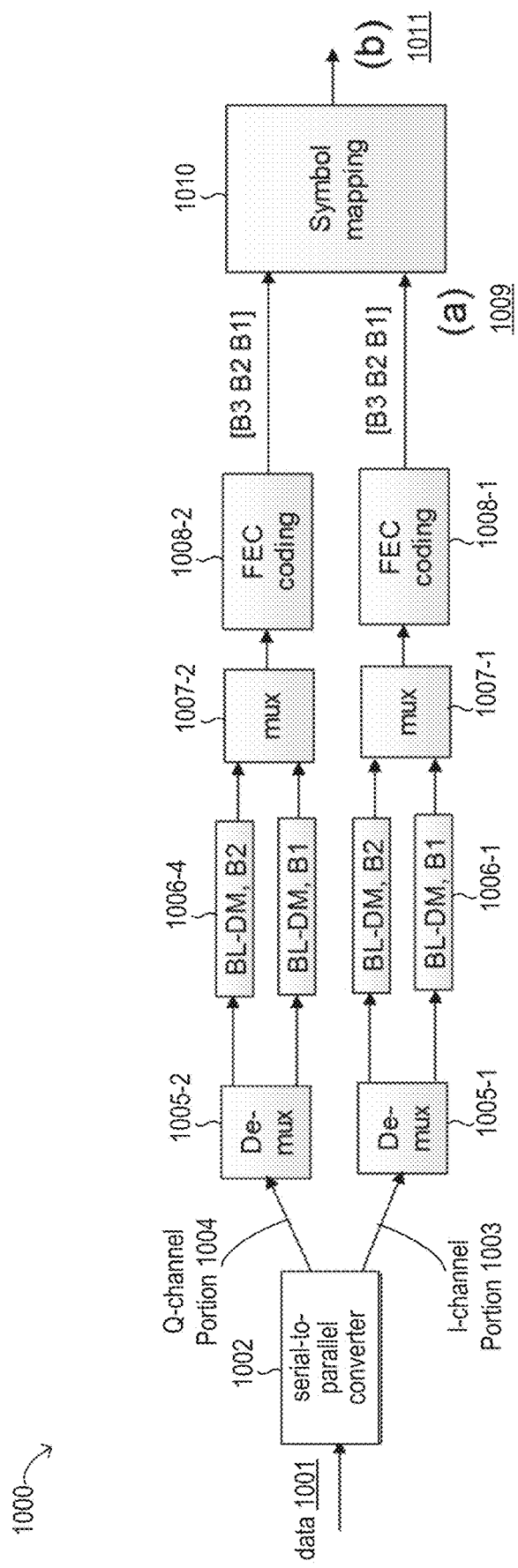
FIG. 10 is a schematic diagram illustrating selected elements of a transmitter portion of an example optical transmission system configured to apply probabilistic amplitude shaping to a QAM signal in an optical network using low rate loss bit-level distribution matchers, according to some embodiments.

FIG. 10 is a schematic diagram illustrating selected elements of a transmitter portion 1000 of an example optical transmission system configured to apply probabilistic shaping to a QAM signal in an optical network using low rate loss bit-level distribution matchers, according to some embodiments. In this example, a QAM signal, shown as data 1001, is provided to a serial-to-parallel converter 1002 of transmitter portion 1000, which routes the Q-channel portion 1004 of the signal to the upper processing path shown in FIG. 10 and routes the I-channel portion 1003 of the signal to the parallel lower processing path. Each processing path includes a respective de-multiplexer 1005, two low rate loss bit-level distribution matchers, such as those described herein, a respective multiplexer 1007, and a respective FEC encoder 1006. The output of each FEC encoder is a sequence of output blocks, each including a sign bit B3, a B2 codeword, and a B1 codeword that collectively represent probability distributions for amplitudes in the Q- and I-dimensions. The transmitter portion 1000 also includes a single symbol mapper 1010, which maps the output blocks to respective symbols for transmission over an optical channel.

In this example, for each of the two channels, Q and I, the output block size for each bit-level distribution matcher is 50, the maximum number of bits having a bit value of '1' for B2 codewords, using inverted bits, is 21, the maximum number of bits having a bit value of '1' for B1 codewords, using inverted bits, is 16, the target probability $P_1(B_2)=0.7$, and the target probability $P_1(B_1)=0.6$.

Figure 11A:
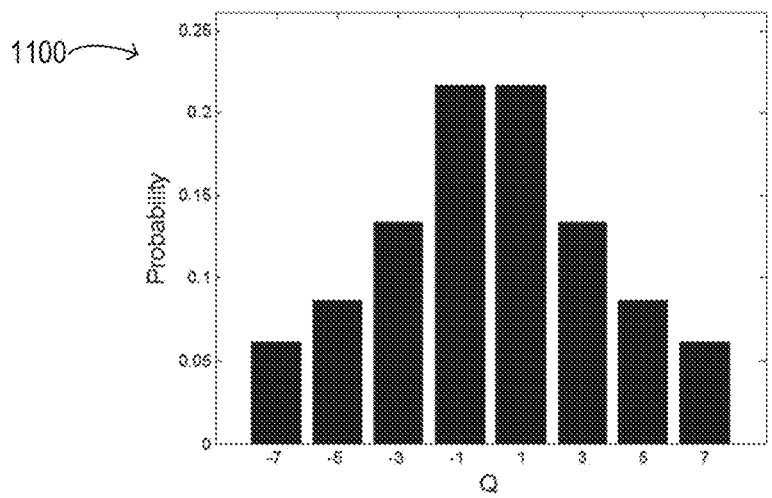
FIG. 11A illustrates a result of probabilistic amplitude shaping on the Q-channel of a 64-QAM signal, according to some embodiments.

FIG. 11A illustrates a result of probabilistic amplitude shaping on the Q-channel of a 64-QAM signal, according to some embodiments. More specifically, probability distribution 1100 represents the result of probabilistic amplitude shaping on the Q-channel of a 64-QAM signal at point (a) 1009 in FIG. 10, using the low rate loss bit-level distribution matchers described herein.

Figure 11B:
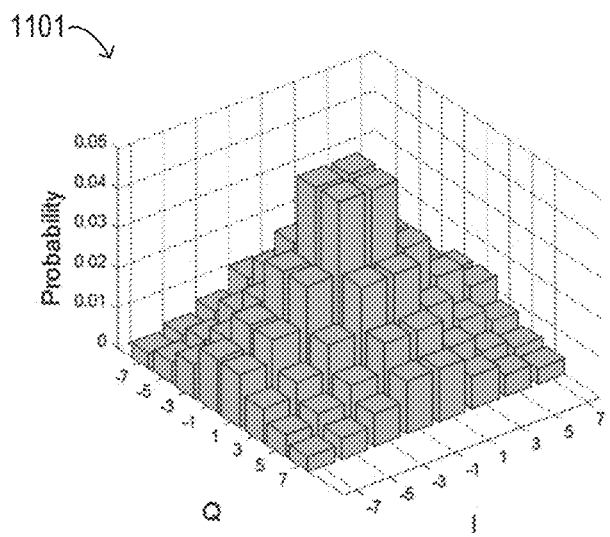
FIG. 11B illustrates an overall result of probabilistic amplitude shaping for 64-QAM, according to some embodiments.

FIG. 11B illustrates an overall result of probabilistic amplitude shaping for 64-QAM, according to some embodiments. More specifically, probability distribution 1101 represents the overall result of probabilistic amplitude shaping for a 64-QAM signal at point (b) 1011 in FIG. 10.

Bit-level distribution matching may reduce the implementation complexity of distribution matching compared to symbol-based distribution matching by parallelizing the matcher process at the bit level, rather than applying the matcher process at the symbol level. As disclosed herein, systems and methods for reducing rate loss in bit-level distribution matchers may allow for an increased number of potential codewords by removing the constant modulus constraint, which further reduces implementation complexity, while achieving probability shaping that is comparable to that of bit-level distribution matchers that enforce a constant modulus. The low rate loss bit-level distribution matchers described herein may reduce the rate loss for the same output block size compared to bit-level distribution matchers based on constant modulus, and achieve similar shaping results using a smaller output block size.

Figure 12:
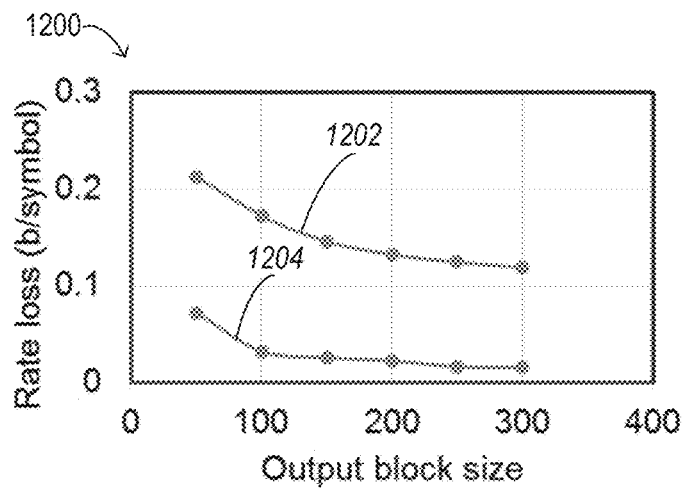
FIG. 12 illustrates a rate loss improvement using a bit-level distribution matcher without a constant modulus, according to some embodiments.

FIG. 12 illustrates a rate loss improvement using a bit-level distribution matcher without a constant modulus, according to some embodiments. Specifically, graph 1200 illustrates a rate loss curve 1202 for a bit-level distribution matcher implemented using constant composition distribution matching and a rate loss curve 1204 for a low rate loss bit-level distribution matcher that does not enforce a constant modulus. The rate loss improvement without a constant modulus is illustrated in FIG. 12 as the difference between the two curves.

While example techniques for selecting codewords to be assigned to input blocks by low rate loss bit-level distribution matchers are described in detail herein, in other embodiments, different techniques, or combinations of techniques, may be used to select the available codewords for low rate loss bit-level distribution matchers that implement matching based on an average probability of a given bit value among the available codewords, rather than a constant probability.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A bit-level distribution matcher for probabilistic constellation shaping, comprising circuitry configured to:
    receive a portion of a binary bit stream to be transmitted as an optical signal;
    for each input block of consecutively received binary bits in the portion of the binary bit stream having a predetermined input block size:
        assign, based on values of the consecutively received binary bits in the input block, a respective codeword for the input block having a predetermined output block size, the respective codeword including a number of binary bits having a given bit value that is dependent on a predetermined target probability distribution for input blocks received by the bit-level distribution matcher; and
        output the respective codeword as an element of a shaped bit sequence representing the portion of the binary bit stream;
    wherein:
        a one-to-one mapping exists between each combination of bit values possible to be included in an input block received by the bit-level distribution matcher and the respective codeword to be assigned to input blocks containing the combination of bit values;
        for at least two of the possible combinations of bit values, the respective codeword to be assigned to the input blocks containing the combination of bit values includes a number of binary bits having the given bit value that is different than a number of binary bits having the given bit value that corresponds to the predetermined target probability distribution for the input blocks received by the bit-level distribution matcher; and
        for all of the possible combinations of bit values, an average number of binary bits having the given bit value in the respective codewords to be assigned to the input blocks containing the combinations of bit values is equal to the number of binary bits having the given bit value that corresponds to the predetermined target probability distribution for the input blocks received by the bit-level distribution matcher.

2. The bit-level distribution matcher of claim 1, wherein to assign the respective codeword for the input block, the bit-level distribution matcher comprises circuitry to:
    determine, based on values of the received binary bits in the input block, an index value for the input block; and
    map the index value for the input block to the respective codeword.

3. The bit-level distribution matcher of claim 1, wherein the respective codeword is selected from among all the possible codewords of the output block size including no more than a predetermined maximum number of bits having the given bit value.

4. The bit-level distribution matcher of claim 1, wherein:
    the portion of the bit stream is received from a demultiplexer that routes consecutive bits in the binary bit stream to different ones of a plurality of bit-level distribution matchers; and
    at least two of the plurality of bit-level distribution matchers are associated with different predetermined target probability distributions for the received input blocks.

5. The bit-level distribution matcher of claim 1, wherein the given bit value is a value of one and the predetermined target probability distribution defines a number of bits in the respective codewords to be assigned to the input blocks by the bit-level distribution matcher having a value of one.

6. The bit-level distribution matcher of claim 1, wherein the given bit value is a value of zero and the predetermined target probability distribution defines a number of bits in the respective codewords to be assigned to the input blocks by the bit-level distribution matcher having a value of one.

7. A method for probabilistic constellation shaping using bit-level distribution matching, comprising:
    receiving, by a first bit-level distribution matcher, a portion of a binary bit stream to be transmitted as an optical signal;

for each input block of consecutively received binary bits in the portion of the binary bit stream having a predetermined input block size:
assigning, based on values of the consecutively received binary bits in the input block, a respective codeword for the input block having a predetermined output block size, the respective codeword including a number of binary bits having a given bit value that is dependent on a predetermined target probability distribution for input blocks received by the first bit-level distribution matcher; and
outputting the respective codeword as an element of a shaped bit sequence representing the portion of the binary bit stream; and
generating the optical signal to be transmitted dependent on the shaped bit sequence output by the first bit-level distribution matcher;
wherein:
a one-to-one mapping exists between each combination of bit values possible to be included in an input block received by the first bit-level distribution matcher and the respective codeword to be assigned to input blocks containing the combination of bit values;
for at least two of the possible combinations of bit values, the respective codeword to be assigned to the input blocks containing the combination of bit values includes a number of binary bits having the given bit value that is different than a number of binary bits having the given bit value that corresponds to the predetermined target probability distribution for input blocks received by the first bit-level distribution matcher; and
for all of the possible combinations of bit values, an average number of binary bits having the given bit value in the respective codewords to be assigned to the input blocks containing the combinations of bit values is equal to the number of binary bits having the given bit value that corresponds to the predetermined target probability distribution for the input blocks received by the first bit-level distribution matcher.

8. The method of claim 7, wherein assigning the respective codeword for the input block comprises:
determining, based on values of the received binary bits in the input block, an index value for the input block; and
mapping the index value for the input block to the respective codeword.

9. The method of claim 7, wherein assigning the respective codeword for the input block comprises selecting the respective codeword from among all the possible codewords of the output block size including no more than a predetermined maximum number of bits having the given bit value.

10. The method of claim 7, wherein receiving the portion of the binary bit stream comprises receiving the portion of the binary bit stream from a demultiplexer that routes consecutive bits in the binary bit stream to different ones of a plurality of bit-level distribution matchers including the first bit-level distribution matcher.

11. The method of claim 10, wherein the predetermined target probability distribution for the input blocks received by the first bit-level distribution matcher is different than a second predetermined target probability distribution for the input blocks received by a second one of the plurality of bit-level distribution matchers.

12. The method of claim 10, wherein the given bit value is a value of one and the predetermined target probability distribution defines a number of bits in the respective codewords to be assigned to the input blocks by the first bit-level distribution matcher having a value of one.

13. The method of claim 7, further comprising, prior to receiving the portion of the binary bit stream:
identifying, based on a bounded-energy trellis representation of potential output block elements, all the possible codewords of the output block size including no more than a predetermined maximum number of bits having the given bit value;
selecting a subset of the identified codewords to be assigned to the input blocks by the first bit-level distribution matcher such that an average number of binary bits having the given bit value in the selected subset of identified codewords is equal to the number of binary bits having the given bit value that corresponds to the predetermined target probability distribution; and
configuring the first bit-level distribution matcher to assign the respective codeword for the input block according to a one-to-to mapping between each combination of bit values possible to be included in an input block received by the first bit-level distribution matcher and a respective codeword in the selected subset of the identified codewords.

14. The method of claim 7, further comprising:
determining, based on a bounded-energy trellis representation of potential output block elements, an index value associated with the respective codeword assigned for the input block; and
recovering, by a bit-level distribution de-matcher, the input block from the respective codeword based on the determined index value.

15. An optical transport network for constellation shaping using bit-level distribution matching, the optical transport network comprising:
an optical transmission path, including an optical transmitter and an optical receiver, the optical transmitter configured to:
receive, by a first bit-level distribution matcher of the optical transmitter, a portion of a binary bit stream to be transmitted as an optical signal;
for each input block of consecutively received binary bits in the portion of the binary bit stream having a predetermined input block size:
assign, based on values of the consecutively received binary bits in the input block, a respective codeword for the input block having a predetermined output block size, the respective codeword including a number of binary bits having a given bit value that is dependent on a predetermined target probability distribution for input blocks received by the first bit-level distribution matcher; and
output the respective codeword as an element of a shaped bit sequence representing the portion of the binary bit stream; and
generate the optical signal to be transmitted dependent on the shaped bit sequence output by the first bit-level distribution matcher;
wherein:
a one-to-one mapping exists between each combination of bit values possible to be included in an input block received by the first bit-level distribution matcher and the respective codeword to be assigned to input blocks containing the combination of bit values;
for at least two of the possible combinations of bit values, the respective codeword to be assigned to the input blocks containing the combination of bit values includes a number of binary bits having the given bit value that is different than a number of binary bits having the given bit value that corresponds to the predetermined target probability distribution for the input blocks received by the first bit-level distribution matcher; and for all of the possible combinations of bit values, an average number of binary bits having the given bit value in the respective codewords to be assigned to input blocks containing the combinations of bit values is equal to the number of binary bits having the given bit value that corresponds to the predetermined target probability distribution for input blocks received by the first bit-level distribution matcher.

16. The optical transport network of claim 15, wherein to assign the respective codeword for the input block, the optical transmitter is further configured to:

determine, based on values of the received binary bits in the input block, an index value for the input block; and map the index value for the input block to the respective codeword.

17. The optical transport network of claim 15, wherein the respective codeword is selected from among all the possible codewords of the output block size including no more than a predetermined maximum number of bits having the given bit value.

18. The optical transport network of claim 15, wherein the portion of the bit stream is received from a de-multiplexing element of the optical transmitter that routes consecutive bits in the binary bit stream to different ones of a plurality of bit-level distribution matchers.

19. The optical transport network of claim 18, wherein at least two of the plurality of bit-level distribution matchers are associated with different predetermined target probability distributions.

20. The optical transport network of claim 15, wherein:

an index value is associated with the respective codeword assigned for the input block, the index value being based on a bounded-energy trellis representation of potential output block elements; and the optical receiver is configured to recover, by a bit-level distribution de-matcher of the optical receiver, the input block from the respective codeword based on the index value.

\* \* \* \* \*